United States Patent
Koganti

(10) Patent No.: US 11,630,901 B2
(45) Date of Patent: Apr. 18, 2023

(54) EXTERNAL TRIGGER INDUCED BEHAVIORAL ANALYSES

(71) Applicant: Forcepoint, LLC, Austin, TX (US)

(72) Inventor: Sri Koganti, Cork (IE)

(73) Assignee: Forcepoint LLC, Austin, TX (US)

( * ) Notice: Subject to any disclaimer, the term of this patent is extended or adjusted under 35 U.S.C. 154(b) by 345 days.

(21) Appl. No.: 16/780,428

(22) Filed: Feb. 3, 2020

(65) Prior Publication Data

US 2021/0240835 A1   Aug. 5, 2021

(51) Int. Cl.
*H04L 29/06* (2006.01)
*G06F 21/57* (2013.01)
*G06F 21/55* (2013.01)

(52) U.S. Cl.
CPC .......... *G06F 21/577* (2013.01); *G06F 21/552* (2013.01); *G06F 2221/034* (2013.01)

(58) Field of Classification Search
CPC ... H04L 63/10; H04L 63/1425; G06F 21/316; G06F 21/335; G06F 21/55; G06F 21/552; G06F 21/554; G06F 21/566; G06F 21/70; G06F 21/83; G06F 21/577; G06F 2221/034
See application file for complete search history.

(56) References Cited

U.S. PATENT DOCUMENTS

| | | |
|---|---|---|
| 6,072,875 A | 6/2000 | Tsudik |
| 6,678,693 B1 | 1/2004 | Shiraishi |
| 7,107,447 B2 | 9/2006 | Sanin et al. |
| 7,694,150 B1 | 4/2010 | Kirby |
| 7,725,565 B2 | 5/2010 | Li et al. |

(Continued)

FOREIGN PATENT DOCUMENTS

| | | |
|---|---|---|
| WO | 2019153581 A1 | 8/2019 |
| WO | WO-2019153581 A1 | 8/2019 |

OTHER PUBLICATIONS

Almehadi et al, On the Possibility of Insider Threat Prevention Using Intent-Based Access Control (IBAC), IEEE, vol. 11 issue 2, 2015, pp. 373-384. (Year: 2015).*

(Continued)

*Primary Examiner* — Luu T Pham
*Assistant Examiner* — Jenise E Jackson
(74) *Attorney, Agent, or Firm* — Terrile, Cannatti & Chambers; Stephen A. Terrile

(57) ABSTRACT

A mechanism is provided for using triggered stimuli to enhance contextual information regarding detected risk events in a networked system. Embodiments monitor a system to identify risk-associated behavior, and upon detecting such behavior, can provide stimulus to a user associated with the risk-associated behavior to determine additional context behind the behavior, thereby initiating a two-way communication to acquire more information. If user response to the stimulus indicates a high risk associated with the behavior, then the system can trigger security measures to restrict the behavior. Some embodiments provide stimuli that are directly related to the nature of the risk-associated behavior, in order to better contextualize the behavior. In some embodiments, the stimuli are only applied if the risk-associated behavior presents a measure of risk above a predetermined threshold.

15 Claims, 8 Drawing Sheets

(56) References Cited

U.S. PATENT DOCUMENTS

| | | |
|---|---|---|
| 7,813,944 B1 | 10/2010 | Luk et al. |
| 7,933,960 B2 | 4/2011 | Chen et al. |
| 8,181,253 B1 | 5/2012 | Zaitsev et al. |
| 8,312,064 B1 | 11/2012 | Gauvin |
| 8,424,061 B2 | 4/2013 | Rosenoer |
| 8,484,066 B2 | 7/2013 | Miller et al. |
| 8,490,163 B1 | 7/2013 | Harsell et al. |
| 8,713,633 B2 | 4/2014 | Thomas |
| 8,776,168 B1 | 7/2014 | Gibson et al. |
| 8,826,443 B1 | 9/2014 | Raman et al. |
| 8,892,690 B2 | 11/2014 | Liu et al. |
| 8,990,930 B2 | 3/2015 | Burrell et al. |
| 9,015,812 B2 | 4/2015 | Plattenghe et al. |
| 9,015,847 B1 | 4/2015 | Kaplan et al. |
| 9,043,905 B1 | 5/2015 | Allen et al. |
| 9,053,124 B1 | 6/2015 | Dornquast et al. |
| 9,128,995 B1 | 9/2015 | Fletcher et al. |
| 9,137,318 B2 | 9/2015 | Hong |
| 9,166,999 B1 | 10/2015 | Kulkarni et al. |
| 9,223,972 B1 | 12/2015 | Vincent et al. |
| 9,246,941 B1 | 1/2016 | Gibson et al. |
| 9,262,722 B1 | 2/2016 | Daniel |
| 9,298,726 B1 | 3/2016 | Mondal et al. |
| 9,342,553 B1 | 5/2016 | Fuller |
| 9,369,433 B1 | 6/2016 | Paul et al. |
| 9,485,266 B2 | 11/2016 | Baxley et al. |
| 9,542,650 B2 | 1/2017 | Lospinoso et al. |
| 9,596,146 B2 | 3/2017 | Coates et al. |
| 9,609,010 B2 | 3/2017 | Sipple |
| 9,665,854 B1 | 5/2017 | Burger et al. |
| 9,692,762 B2 | 6/2017 | Barkan et al. |
| 9,755,913 B2 | 9/2017 | Bhide et al. |
| 9,762,582 B1 | 9/2017 | Hockings et al. |
| 9,798,883 B1 | 10/2017 | Gil et al. |
| 9,935,891 B1 | 4/2018 | Stamos |
| 9,977,824 B2 | 5/2018 | Agarwal et al. |
| 10,096,065 B2 | 10/2018 | Little |
| 10,108,544 B1 | 10/2018 | Duggal et al. |
| 10,187,369 B2 | 1/2019 | Caldera et al. |
| 10,210,283 B2 | 2/2019 | Broz et al. |
| 10,235,285 B1 | 3/2019 | Wallace |
| 10,237,298 B1 | 3/2019 | Nguyen et al. |
| 10,270,794 B1 | 4/2019 | Mukerji et al. |
| 10,275,671 B1 | 4/2019 | Newman |
| 10,282,702 B2 | 5/2019 | Paltenghe et al. |
| 10,284,601 B1 | 5/2019 | Bar-Menachem et al. |
| 10,320,813 B1 | 6/2019 | Ahmed et al. |
| 10,341,391 B1 | 7/2019 | Pandey et al. |
| 10,417,454 B1 | 9/2019 | Marom et al. |
| 10,417,653 B2 | 9/2019 | Milton et al. |
| 10,419,428 B2 | 9/2019 | Tunnell et al. |
| 10,432,669 B1 | 10/2019 | Badhwar et al. |
| 10,545,738 B1 | 1/2020 | Jaeger et al. |
| 10,579,281 B2 | 3/2020 | Cherubini et al. |
| 10,713,934 B2 | 7/2020 | Sayavong et al. |
| 10,769,908 B1 | 9/2020 | Burris et al. |
| 10,917,319 B2 | 2/2021 | Scheib et al. |
| 11,061,874 B1 | 7/2021 | Funk et al. |
| 2002/0112015 A1 | 8/2002 | Haynes |
| 2002/0123865 A1 | 9/2002 | Whitney et al. |
| 2004/0034582 A1 | 2/2004 | Gilliam et al. |
| 2004/0044613 A1 | 3/2004 | Murakami et al. |
| 2005/0120025 A1 | 6/2005 | Rodriguez et al. |
| 2005/0198099 A1 | 9/2005 | Motsinger et al. |
| 2005/0273850 A1 | 12/2005 | Freund |
| 2006/0048209 A1 | 3/2006 | Shelest et al. |
| 2006/0053476 A1 | 3/2006 | Bezilla et al. |
| 2006/0112111 A1 | 5/2006 | Tseng et al. |
| 2006/0117172 A1 | 6/2006 | Zhang et al. |
| 2006/0129382 A1 | 6/2006 | Anand et al. |
| 2006/0195905 A1 | 8/2006 | Fudge |
| 2006/0206449 A1 | 9/2006 | Fletcher et al. |
| 2006/0225124 A1 | 10/2006 | Kolawa et al. |
| 2007/0043703 A1 | 2/2007 | Bhattacharya et al. |
| 2007/0121522 A1 | 5/2007 | Carter |
| 2007/0225995 A1 | 9/2007 | Moore |
| 2007/0234409 A1 | 10/2007 | Eisen |
| 2008/0168002 A1 | 7/2008 | Kagarlis et al. |
| 2008/0168135 A1 | 7/2008 | Redlich et al. |
| 2008/0168453 A1 | 7/2008 | Hutson et al. |
| 2008/0198453 A1 | 8/2008 | LaFontaine et al. |
| 2008/0244741 A1 | 10/2008 | Gustafson et al. |
| 2009/0006888 A1 | 1/2009 | Bernhard et al. |
| 2009/0177979 A1 | 7/2009 | Garbow et al. |
| 2009/0182872 A1 | 7/2009 | Hong |
| 2009/0228474 A1 | 9/2009 | Chiu et al. |
| 2009/0300712 A1 | 12/2009 | Kaufmann et al. |
| 2010/0024014 A1 | 1/2010 | Kailash et al. |
| 2010/0057662 A1 | 3/2010 | Collier et al. |
| 2010/0058016 A1 | 3/2010 | Nikara et al. |
| 2010/0094767 A1 | 4/2010 | Miltonberger |
| 2010/0094818 A1 | 4/2010 | Farrell et al. |
| 2010/0107255 A1 | 4/2010 | Eiland et al. |
| 2010/0146622 A1 | 6/2010 | Nordstrom et al. |
| 2010/0205224 A1 | 8/2010 | Palanisamy et al. |
| 2010/0228656 A1 | 9/2010 | Wasserblat et al. |
| 2010/0235495 A1 | 9/2010 | Petersen et al. |
| 2010/0275263 A1 | 10/2010 | Bennett et al. |
| 2011/0061093 A1 | 3/2011 | Korkus et al. |
| 2011/0167105 A1 | 7/2011 | Ramakrishnan et al. |
| 2011/0307957 A1 | 12/2011 | Barcelo et al. |
| 2012/0046989 A1 | 2/2012 | Baikalov et al. |
| 2012/0047575 A1 | 2/2012 | Baikalov et al. |
| 2012/0079107 A1 | 3/2012 | Williams et al. |
| 2012/0110087 A1 | 5/2012 | Culver et al. |
| 2012/0137367 A1 | 5/2012 | Dupont et al. |
| 2012/0210158 A1 | 8/2012 | Akiyama et al. |
| 2012/0259807 A1 | 10/2012 | Dymetman |
| 2012/0290215 A1 | 11/2012 | Adler et al. |
| 2013/0013550 A1 | 1/2013 | Kerby |
| 2013/0054433 A1 | 2/2013 | Giard et al. |
| 2013/0055367 A1 | 2/2013 | Kshirsagar et al. |
| 2013/0081141 A1 | 3/2013 | Anurag |
| 2013/0097662 A1 | 4/2013 | Pearcy et al. |
| 2013/0102283 A1 | 4/2013 | Lau et al. |
| 2013/0104236 A1 | 4/2013 | Ray et al. |
| 2013/0132551 A1 | 5/2013 | Bose et al. |
| 2013/0174259 A1 | 7/2013 | Pearcy et al. |
| 2013/0205366 A1 | 8/2013 | Luna et al. |
| 2013/0227712 A1* | 8/2013 | Salem ................ G06F 21/6218 726/30 |
| 2013/0238422 A1 | 9/2013 | Saldanha |
| 2013/0290598 A1 | 10/2013 | Fiske et al. |
| 2013/0297729 A1 | 11/2013 | Suni et al. |
| 2013/0305358 A1 | 11/2013 | Gathala et al. |
| 2013/0317808 A1 | 11/2013 | Kruel et al. |
| 2013/0320212 A1 | 12/2013 | Valentino et al. |
| 2013/0340035 A1 | 12/2013 | Uziel et al. |
| 2014/0075004 A1 | 3/2014 | Van Dusen et al. |
| 2014/0096215 A1 | 4/2014 | Hessler |
| 2014/0173727 A1 | 6/2014 | Lingafelt et al. |
| 2014/0199663 A1 | 7/2014 | Sadeh-Koniecpol et al. |
| 2014/0205099 A1 | 7/2014 | Christodorescu et al. |
| 2014/0214938 A1 | 7/2014 | Bhatt et al. |
| 2014/0283075 A1 | 9/2014 | Drissel et al. |
| 2014/0325634 A1 | 10/2014 | Iekel-Johnson et al. |
| 2014/0356445 A1 | 12/2014 | Little |
| 2015/0082430 A1 | 3/2015 | Sridhara et al. |
| 2015/0113646 A1 | 4/2015 | Lee et al. |
| 2015/0154263 A1 | 6/2015 | Boddhu et al. |
| 2015/0161386 A1 | 6/2015 | Gupta et al. |
| 2015/0199511 A1 | 7/2015 | Faile, Jr. et al. |
| 2015/0199629 A1 | 7/2015 | Faile, Jr. et al. |
| 2015/0205954 A1 | 7/2015 | Jou et al. |
| 2015/0215325 A1 | 7/2015 | Ogawa |
| 2015/0220625 A1 | 8/2015 | Cartmell et al. |
| 2015/0256550 A1 | 9/2015 | Taylor et al. |
| 2015/0269383 A1 | 9/2015 | Lang et al. |
| 2015/0286819 A1 | 10/2015 | Coden et al. |
| 2015/0288709 A1 | 10/2015 | Singhal et al. |
| 2015/0324559 A1 | 11/2015 | Boss et al. |
| 2015/0324563 A1 | 11/2015 | Deutschmann et al. |
| 2015/0326613 A1 | 11/2015 | Devarajan et al. |
| 2015/0350902 A1 | 12/2015 | Baxley et al. |

(56) References Cited

U.S. PATENT DOCUMENTS

| | | | |
|---|---|---|---|
| 2015/0356488 A1 | 12/2015 | Eden et al. | |
| 2015/0381631 A1* | 12/2015 | Salem | H04L 63/102 |
| | | | 726/4 |
| 2016/0021117 A1 | 1/2016 | Harmon et al. | |
| 2016/0036844 A1 | 2/2016 | Kopp et al. | |
| 2016/0078362 A1 | 3/2016 | Christodorescu et al. | |
| 2016/0092774 A1 | 3/2016 | Wang et al. | |
| 2016/0105334 A1 | 4/2016 | Boe et al. | |
| 2016/0117937 A1 | 4/2016 | Penders et al. | |
| 2016/0147380 A1 | 5/2016 | Coates et al. | |
| 2016/0164922 A1 | 6/2016 | Boss et al. | |
| 2016/0224803 A1 | 8/2016 | Frank et al. | |
| 2016/0226914 A1 | 8/2016 | Doddy et al. | |
| 2016/0232353 A1 | 8/2016 | Gupta et al. | |
| 2016/0247158 A1 | 8/2016 | Kolotinsky | |
| 2016/0261621 A1 | 9/2016 | Srivastava et al. | |
| 2016/0277360 A1 | 9/2016 | Dwyier et al. | |
| 2016/0277435 A1 | 9/2016 | Salajegheh et al. | |
| 2016/0286244 A1 | 9/2016 | Chang et al. | |
| 2016/0300049 A1 | 10/2016 | Guedalia et al. | |
| 2016/0308890 A1 | 10/2016 | Weilbacher | |
| 2016/0330219 A1 | 11/2016 | Hasan | |
| 2016/0330746 A1 | 11/2016 | Mehrabanzad et al. | |
| 2016/0335865 A1 | 11/2016 | Sayavong et al. | |
| 2016/0371489 A1 | 12/2016 | Puri et al. | |
| 2017/0032274 A1 | 2/2017 | Yu et al. | |
| 2017/0053280 A1 | 2/2017 | Lishok et al. | |
| 2017/0063888 A1 | 3/2017 | Muddu et al. | |
| 2017/0070471 A1* | 3/2017 | Curran | G06Q 50/01 |
| 2017/0070521 A1 | 3/2017 | Bailey et al. | |
| 2017/0104790 A1 | 4/2017 | Meyers et al. | |
| 2017/0116054 A1 | 4/2017 | Boddhu et al. | |
| 2017/0155669 A1 | 6/2017 | Sudo et al. | |
| 2017/0171609 A1 | 6/2017 | Koh | |
| 2017/0230418 A1 | 8/2017 | Amar et al. | |
| 2017/0255938 A1 | 9/2017 | Biegun et al. | |
| 2017/0279616 A1 | 9/2017 | Loeb et al. | |
| 2017/0286671 A1 | 10/2017 | Chari et al. | |
| 2017/0331828 A1 | 11/2017 | Caldera et al. | |
| 2017/0149815 A1 | 12/2017 | Bolgert | |
| 2017/0365101 A1* | 12/2017 | Samec | G02B 27/017 |
| 2018/0004948 A1 | 1/2018 | Martin et al. | |
| 2018/0007069 A1 | 1/2018 | Hunt et al. | |
| 2018/0018456 A1 | 1/2018 | Chen et al. | |
| 2018/0024901 A1 | 1/2018 | Tankersley et al. | |
| 2018/0025273 A1 | 1/2018 | Jordan et al. | |
| 2018/0027006 A1 | 1/2018 | Zimmermann et al. | |
| 2018/0081661 A1 | 3/2018 | Gonzalez del Solar et al. | |
| 2018/0082307 A1 | 3/2018 | Ochs et al. | |
| 2018/0091520 A1 | 3/2018 | Camenisch et al. | |
| 2018/0107528 A1 | 4/2018 | Vizer et al. | |
| 2018/0121514 A1 | 5/2018 | Reisz et al. | |
| 2018/0139227 A1 | 5/2018 | Martin et al. | |
| 2018/0145995 A1 | 5/2018 | Roeh et al. | |
| 2018/0150570 A1 | 5/2018 | Broyd et al. | |
| 2018/0191745 A1 | 7/2018 | Moradi et al. | |
| 2018/0191766 A1 | 7/2018 | Holeman et al. | |
| 2018/0191857 A1 | 7/2018 | Schooler et al. | |
| 2018/0204215 A1 | 7/2018 | Hu et al. | |
| 2018/0232111 A1 | 8/2018 | Jones et al. | |
| 2018/0232426 A1 | 8/2018 | Gomez et al. | |
| 2018/0234434 A1 | 8/2018 | Viljoen | |
| 2018/0248863 A1 | 8/2018 | Kao et al. | |
| 2018/0276541 A1 | 9/2018 | Studnitzer et al. | |
| 2018/0285363 A1 | 10/2018 | Dennis et al. | |
| 2018/0288063 A1 | 10/2018 | Koottayi et al. | |
| 2018/0295141 A1 | 10/2018 | Solotorevsky | |
| 2018/0332062 A1 | 11/2018 | Ford | |
| 2018/0336353 A1 | 11/2018 | Manadhata et al. | |
| 2018/0341758 A1 | 11/2018 | Park et al. | |
| 2018/0341889 A1 | 11/2018 | Psalmonds et al. | |
| 2018/0349221 A1 | 12/2018 | Harutyunyan et al. | |
| 2018/0349684 A1 | 12/2018 | Bapat et al. | |
| 2019/0014153 A1 | 1/2019 | Lang et al. | |
| 2019/0034625 A1 | 1/2019 | Ford et al. | |
| 2019/0034813 A1 | 1/2019 | Das et al. | |
| 2019/0036969 A1 | 1/2019 | Swafford et al. | |
| 2019/0052660 A1 | 2/2019 | Cassidy et al. | |
| 2019/0095478 A1 | 3/2019 | Tankersley et al. | |
| 2019/0158503 A1 | 5/2019 | Bansal et al. | |
| 2019/0174319 A1 | 6/2019 | Backholm et al. | |
| 2019/0222603 A1 | 7/2019 | Yang | |
| 2019/0289021 A1 | 9/2019 | Ford | |
| 2019/0294482 A1 | 9/2019 | Li et al. | |
| 2019/0311105 A1 | 10/2019 | Beiter et al. | |
| 2019/0354703 A1 | 11/2019 | Ford | |
| 2019/0356688 A1 | 11/2019 | Ford | |
| 2019/0356699 A1 | 11/2019 | Ford | |
| 2019/0387002 A1 | 12/2019 | Ford et al. | |
| 2019/0387003 A1 | 12/2019 | Ford et al. | |
| 2019/0392419 A1 | 12/2019 | Deluca et al. | |
| 2020/0034462 A1 | 1/2020 | Narayanaswamy et al. | |
| 2020/0036740 A1 | 1/2020 | Ford | |
| 2020/0065728 A1 | 2/2020 | Wilson et al. | |
| 2020/0076846 A1* | 3/2020 | Pandian | G06F 3/04817 |
| 2020/0076853 A1* | 3/2020 | Pandian | G16H 30/20 |
| 2020/0077265 A1 | 3/2020 | Singh et al. | |
| 2020/0089692 A1 | 3/2020 | Tripathi et al. | |
| 2020/0089848 A1* | 3/2020 | Abdelaziz | G06F 21/552 |
| 2020/0117546 A1 | 4/2020 | Wong et al. | |
| 2020/0279455 A1* | 9/2020 | Zavesky | A63F 13/77 |
| 2020/0334025 A1 | 10/2020 | Wang et al. | |
| 2021/0158056 A1* | 5/2021 | Galarneau | G06K 9/00771 |

OTHER PUBLICATIONS

Almedhadi, Micromovement Behavior as an Intention Detection Measurement for Preventing Insider Threats, IEEE, Jul. 18, 2018, pp. 1-12. (Year: 2018).*
Marinescu, Dan C., Cloud Computing and Computer Clouds, University of Central Florida, 2012, pp. 1-246.
Sean Barnum, Standardized Cyber Threat Intelligence Information with the Structured Threat Information eXpression (STIX) Whitepaper v1.1 (Feb. 20, 2014).
Xiang Sun et al., Event Detection in Social Media Data Streams, IEEE International Conference on Computerand Information Technology; Ubiquitous Computing and Communications; Dependable, Automatic and Secure Computing; Persuasive Intelligence and Computing, pp. 1711-1717, Dec. 2015.
Mesaros et al., Latent Semantic Analysis in Sound Event Detection, 19th European Signal Processing Conference (EUSIPCO 2011), pp. 1307-1311, 2011.
Crandall et al., Inferring Social Ties from Geographic Coincidences, PNAS, vol. 107, No. 52,2010, pp. 22436-22441, 2010.
Ross et al., Bully Prevention in Positive Behavior Support, Journal of Applied Behavior Analysis, 42(4), pp. 747-759, 2009.
Matt Klein, How to Erase Your iOS Device After Too Many Failed Passcode Attempts, https://www.howtogeek.com/264369/ how-to-erase-your-ios-device-after-too-many-failed-passcode-attempts/, Jul. 28, 2016.
Github, The Z3 Theorem Prover, retrieved from internet May 19, 2020, https://github.com/Z3Prover/z3.
John Backes et al., Semantic-based Automated Reasoning for AWS Access Policies using SMT, 2018 Formal Methods in Computer Aided Design (FMCAD), Oct. 30-Nov. 2, 2018 https://d1.awsstatic.com/Security/pdfs/Semantic_Based_Automated_Reasoning_for_AWS_Access_Policies_Using_SMT.pdf.
Singh et al., Container-Based Microservice Architecture for Cloud Applications, International Conference on Computing, Communication and Automation (ICCCA2017), 2017.
Barrere et al., Vulnerability Assessment in Autonomic Networks and Services: A Survey, IEEE, Aug. 30, 2013, vol. 16, issue. 2, pp. 988-1004.
Burns et al., Automatic Management of Network Security Policy, IEEE, Jun. 14, 2001, pp. 12-26.
S. Chambi et al., Better bitmap performance with Roaring bitmaps, arXiv:1402.6407v10 [cs.DB] (Mar. 15, 2016).
Jianguo Wang et al., An Experimental Study of Bitmap Compression vs. Inverted List Compression, SIGMOD 2017: Proceedings of the 2017 ACM Int'l Conf. on Management of Data, pp. 993-1008 (May 2017).

(56) References Cited

OTHER PUBLICATIONS

L. F. Lafuerza et al., Exact Solution of a Stochastic Protein Dynamics Model with Delayed Degradation, Phys. Rev. E 84, 051121, Nov. 18, 2011, pp. 1-8.

Zoubin Ghahramani, Bayesian nonparametrics and the probabilistic approach to modelling, Philosophical Transactions A of the Royal Society, vol. 371 Issue: 1984, Published Dec. 31, 2012, pp. 1-20.

Elena Zheleva et al., Higher-order Graphical Models for Classification in Social and Affiliation Networks, NIPS 2010 Workshop on Networks Across Disciplines: Theory and Applications, Whistler BC, Canada, 2010, pp. 1-7.

Varun Chandola et al., Anomaly Detection: A Survey, ACM Computing Surveys, vol. 41, No. 3, Article 15, Jul. 2009, p. 15.1-58.1.

Judea Pearl, The Causal Foundations of Structural Equation Modeling, Technical Report R-370, Computer Science Department, University of California, Los Angeles, also Chapter 5, R. H. Hoyle (Ed.), Handbook of Structural Equation Modeling, New York, Guilford Press, Jun. 4, 2012, pp. 68-91.

Yueh-Hsuan Chiang, Towards Large-Scale Temporal Entity Matching, Dissertation Abstract, University of Wisconsin-Madison, 2013.

Furong Li, Linking Temporal Records for Profiling Entities, 2015, SIGMOD '15 Proceedings of the 2015 ACM SIGMOD International Conference on Management of Data, pp. 593-605, https://users.soe.ucsc.edu/~tan/papers/2015/modf445-li.pdf.

Peter Christen et al., Adaptive Temporal Entity Resolution on Dynamic Databases, Apr. 2013, http://users.cecs.anu.edu.au/~Peter.Christen/publications/christen2013pakdd-slides.pdf.

Wikipedia, Categorical Distribution, edited Jul. 28, 2018, https://en.wikipedia.org/wiki/Categorical_distribution.

Wikipedia, ONE-HOT, edited May 22, 2018, https://en.wikipedia.org/wiki/One-hot.

Sanjeev Goyal et al., Attack, Defence and Contagion in Networks, The Review of Economic Studies, vol. 81, Issue4, Oct. 2014, pp. 1518-1542, https://doi.org/10.1093/restud/rdu013 (2014).

\* cited by examiner

EXTERNAL TRIGGER INDUCED BEHAVIORAL ANALYSES

BACKGROUND OF THE INVENTION

Field of the Invention

The present invention relates in general to the field of computers and similar technologies, and in particular to software utilized in this field. Still more particularly, it relates to a method, system and computer-usable medium for using tailored stimuli to develop context behind event triggers used to adaptively mitigate security risks.

Description of the Related Art

Users interact with physical, system, data, and services resources of all kinds, as well as each other, on a daily basis. Each of these interactions, whether accidental or intended, poses some degree of security risk, depending on the behavior of the user. In particular, the actions of a formerly trusted user may become malicious as a result of being subverted, compromised or radicalized due to any number of internal or external factors or stressors. For example, financial pressure, political idealism, irrational thoughts, or other influences may adversely affect a user's intent or behavior.

In some behavior analysis systems, user interaction with the system is recorded as "events." But events are limited to user inputs, which can provide insight as to what a user is doing but lack context of user intention. In order to determine whether risk-countering measures should be taken in response to such events, it can be desirable to develop additional context behind the user's intention.

SUMMARY OF THE INVENTION

A method, system and computer-usable medium are disclosed for using triggered stimuli to enhance contextual information regarding detected risk events in a networked system. Embodiments monitor a system to identify risk-associated behavior, and upon detecting such behavior, can provide stimulus to a user associated with the risk-associated behavior to determine additional context behind the behavior, thereby initiating a two-way communication to acquire more information.

In one embodiment, a computer-implemented method for developing context of risk associated behavior in a security analytics environment is provided. The method includes monitoring a first plurality of electronically-observable actions of a user entity operating within the security analytics environment where the first plurality of electronically-observable actions of the user entity correspond to a respective plurality of events enacted by the user entity, converting the first plurality of electronically-observable actions of the user entity to electronic information, converting the first plurality of electronically-observable actions of the user entity to electronic information representing the plurality of events enacted by the user entity, generating a risk adaptive score based on the electronic information representing the plurality of events enacted by the user entity, and generating one or more stress triggers at an endpoint device in the security analytics environment accessed by the user entity if the risk adaptive score exceeds a predetermined threshold in order to develop a context of the first plurality of electronically-observable actions of the user entity.

In one aspect of the above environment, the method further includes, subsequent to generating the one or more stress triggers, monitoring a second plurality of electronically-observable actions of the user entity, wherein the second plurality of electronically-observable actions of the user entity correspond to a respective second plurality of events enacted by the user entity and the second plurality of events are in response to one or more of the stress triggers, converting the second plurality of electronically-observable actions of the user entity to second electronic information representing the second plurality of events enacted by the user entity, modifying the risk adaptive score in response to the second plurality of electronically-observable actions, responding to the first and second plurality of electronically-observable actions of the user entity if the modified risk adaptive score exceeds a second predetermined threshold. In a further aspect, responding to the first and second plurality of electronically-observable actions comprises reducing a risk presented by the first plurality of electronically-observable actions of the user entity to a system encompassed within the security analytics environment. In another further aspect, responding to the first and second plurality of electronically-observable actions includes one or more of: logging the user entity off the endpoint device, shutting down the endpoint device, cancelling a process executed by the user entity, signaling a security administrator, and signaling the user entity. In yet another further aspect, the second plurality of electronically-observable actions of the user entity include physical behavior interactions with the endpoint device comprising one or more of key stroke impact, key stroke speed, misspelling words, facial expressions, and movement of a gesture input device. In another further aspect, the second plurality of electronically-observable actions of the user entity include cyber behavior interactions with the endpoint device comprising one or more of discontinuing file access, disconnecting a storage device from the endpoint device, closing a display window on a display coupled to the endpoint device, changing an operational state of the endpoint device, and closing a lid of the endpoint device.

In another aspect of the above embodiment, the one or more stress triggers include one or more of: modifying brightness of a screen coupled to the endpoint device; modifying display speed of a gesture input device coupled to the endpoint device; modifying responsiveness of a gesture input device coupled to the endpoint device; temporarily swapping one or more key associations of a keyboard coupled to the endpoint device; generating a sound on a speaker coupled to the endpoint device; displaying a popup window on the screen coupled to the endpoint device; and sending an electronic mail message to the user entity. In another aspect, the method further includes performing said generating the one or more stress triggers if the first plurality of electronically-observable actions are identified as risk-associated behavior. In a further aspect, a risk-associated behavior includes one or more of accessing data labeled as critical, accessing customer data, copying significant quantities of data to a removable memory device, and copying significant quantities of data across a network external to the security analytics environment.

Another embodiment provides a security analytics system that includes a processor, a network interface coupled to the processor, and a nontransitory, computer-readable storage medium coupled to the processor. The network interface is communicatively coupled to a remote network node via a network and is configured to receive electronic information representing a first plurality of events enacted by a user entity accessing the remote network node. The nontransitory, computer-readable storage medium stores instructions executable by the processor and those instructions are configured to cause the processor to generate a risk adaptive score based on the electronic information representing the first plurality of events enacted by the user entity, and transmit a signal to the remote network node to generate one or more stress triggers at the remote network node if the risk adaptive score exceeds a predetermined threshold in order to develop a context of the first plurality of events enacted by the user entity.

In one aspect of the above embodiment, the network interface is also configured to receive second electronic information representing a second plurality of events enacted by a user entity accessing the remote network node. The non-transitory, computer-readable storage medium stores further instructions executable by the processor configured to cause the processor to modify the risk adaptive score in response to the electronic information representing the second plurality of events, and respond to the first and second plurality of events if the modified risk adaptive score exceeds a second predetermined threshold. In a further aspect, responding to the first and second plurality of events comprises reducing a risk presented by the first plurality of events to an environment secured by the security analytics system. In another further aspect, responding to the first and second plurality of events includes one or more of: transmitting a signal to the remote network node to log the user entity off the remote network node; transmitting a signal to the remote network node to shut down the remote network node; transmitting a signal to the remote network node to cancel a process executed by the user entity; transmitting a signal to a security administrator of the security analytics system; and transmitting a signal to the user entity. In yet another further aspect, the second plurality of events includes physical behavior interactions with the remote network device comprising one or more of key stroke impact, key stroke speed, misspelling words, facial expressions, and movement of a gesture input device. In another further aspect, the second plurality of events includes cyber behavior interactions with the remote network device comprising one or more of discontinuing file access, disconnecting a storage device from the remote network node, closing a display window on a display coupled to the remote network node, changing an operational state of the remote network node, and closing a lid of the remote network node.

In another aspect of the above embodiment, the one or more stress triggers include one or more of: modifying display speed of a gesture input device coupled to the endpoint device; modifying responsiveness of a gesture input device coupled to the endpoint device; temporarily swapping one or more key associations of a keyboard coupled to the endpoint device; generating a sound on a speaker coupled to the endpoint device; displaying a popup window on the screen coupled to the endpoint device; and, sending an electronic mail message to the user entity. In still another aspect, the non-transitory, computer-readable storage medium stores further instructions executable by the processor configured to cause the processor to transmit the signal to the remote network node to generate the one or more stress triggers if the first plurality of electronically-observable actions are identified as risk-associated behavior. In a further aspect, a risk-associated behavior includes one or more of accessing data labeled as critical, accessing customer data, copying significant quantities of data to a removable memory device, and copying significant quantities of data across a network external to the security analytics environment.

Another embodiment provides a non-transitory, computer-readable storage medium storing computer program code, the computer program code comprising computer executable instructions configured for: monitoring a first plurality of electronically-observable actions of a user entity operating within a security analytics environment, wherein the plurality of electronically-observable actions of the user entity correspond to a respective plurality of events enacted by the user entity; converting the plurality of electronically-observable actions of the user entity to electronic information representing the plurality of actions by the user entity; generating a risk adaptive score based on the electronic information representing the plurality of actions by the user entity; and, generating one or more stress triggers at an endpoint device in the security analytics environment accessed by the user entity if the risk adaptive score exceeds a predetermined threshold in order to develop a context of the first plurality of electronically-observable actions of the user entity. In a further aspect, further computer executable instructions are stored that are configured for, subsequent to generating the one or more stress triggers: monitoring a second plurality of electronically-observable actions of the user entity, wherein the second plurality of electronically-observable actions of the user entity correspond to a respective second plurality of events enacted by the user entity and the second plurality of events are in response to one or more of the stress triggers; converting the second plurality of electronically-observable actions of the user entity to second electronic information representing the second plurality of actions by the user entity; modifying the risk adaptive score in response to the second plurality of electronically-observable actions; and, responding to the first and second plurality of electronically-observable actions of the user entity if the modified risk adaptive score exceeds a second predetermined threshold.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A method, system and computer-usable medium are disclosed for using triggered stimuli to enhance contextual information regarding detected risk events in a networked system. Embodiments monitor a system to identify risk-associated behavior, and upon detecting such behavior, can provide stimulus to a user associated with the risk-associated behavior to determine additional context behind the behavior, thereby initiating a two-way communication to acquire more information. If user response to the stimulus indicates a high risk associated with the behavior, then the system can trigger security measures to restrict the behavior. Some embodiments provide stimuli that are directly related to the nature of the risk-associated behavior, in order to better contextualize the behavior. In some embodiments, the stimuli are only applied if the risk-associated behavior presents a measure of risk above a predetermined threshold.

Figure 1:
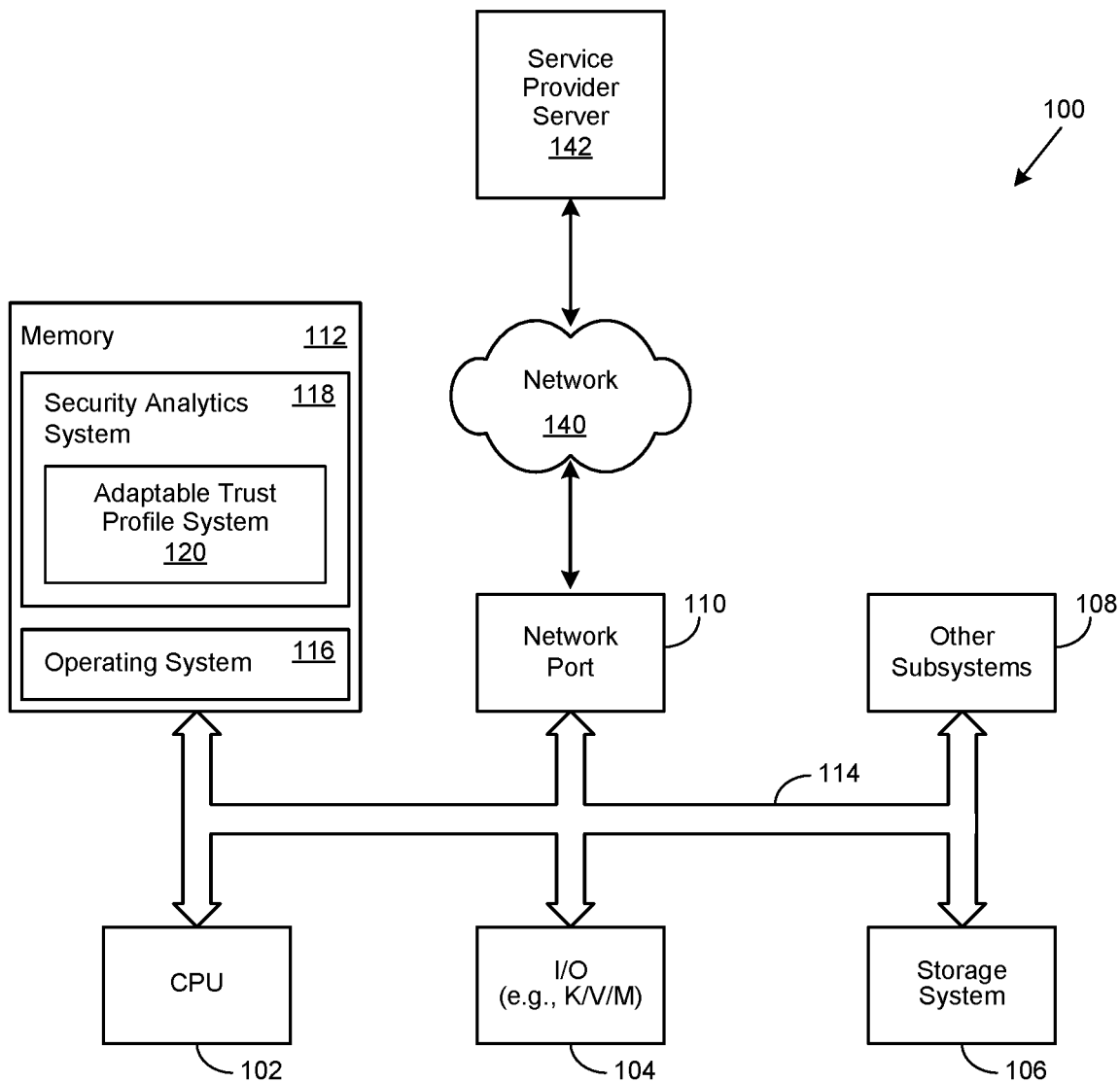
FIG. 1 depicts an exemplary client computer in which the present invention may be implemented.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a gesture input device, and associated controllers, a storage system 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes operating system (OS) 116 and in various embodiments may also include a security analytics system 118. In one embodiment, the information handling system 100 is able to download the security analytics system 118 from the service provider server 142. In another embodiment, the security analytics system 118 is provided as a service from the service provider server 142.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a gesture input device (e.g., mouse, trackball, trackpad, touchscreen, and touch sensitive display device), a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

In various embodiments, the security analytics system 118 performs a security analytics operation. In certain embodiments, the security analytics operation improves processor efficiency, and thus the efficiency of the information handling system 100, by facilitating security analytics functions. As will be appreciated, once the information handling system 100 is configured to perform the security analytics operation, the information handling system 100 becomes a specialized computing device specifically configured to perform the security analytics operation and is not a general purpose computing device. Moreover, the implementation of the security analytics system 118 on the information handling system 100 improves the functionality of the information handling system 100 and provides a useful and concrete result of performing security analytics functions to mitigate security risk. In certain embodiments, the security analytics system 118 may be implemented to include an adaptable trust profile (ATP) system 120. In certain embodiments, the ATP system 120 may be implemented to perform various ATP operations, described in greater detail herein.

Figure 2:
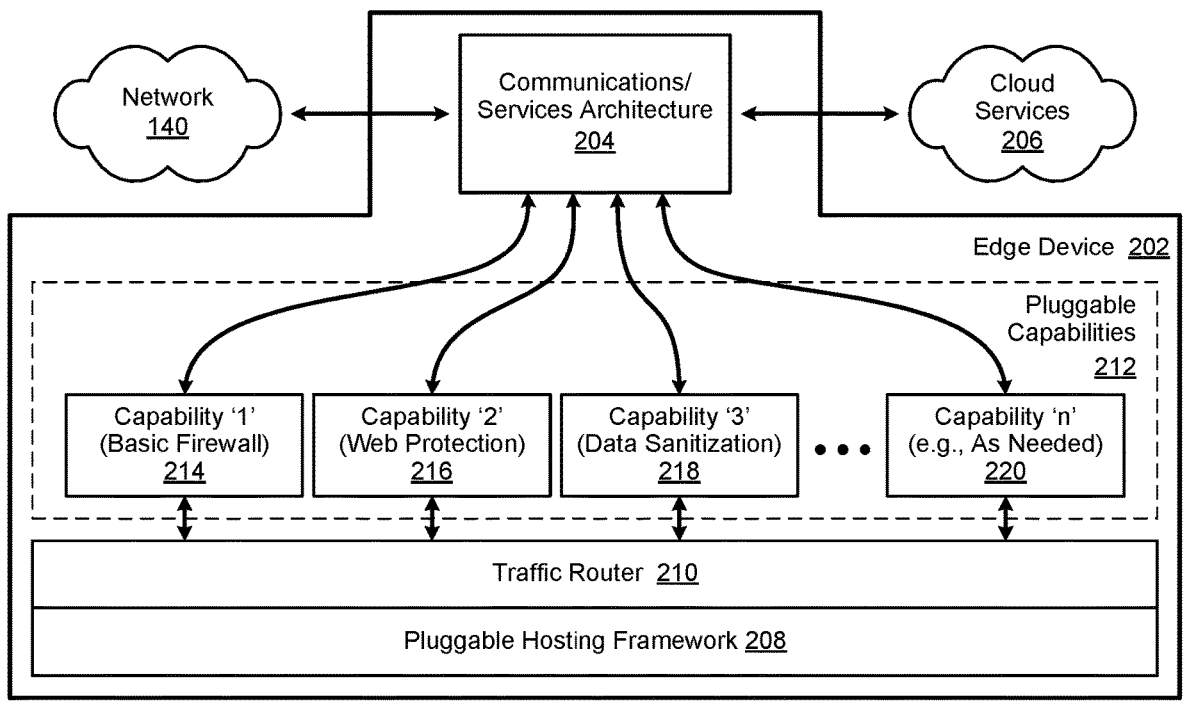
FIG. 2 is a simplified block diagram of an edge device.

FIG. 2 is a simplified block diagram of an edge device implemented in accordance with an embodiment of the invention. As used herein, an edge device, such as the edge device 202 shown in FIG. 2, broadly refers to a device providing an entry point into a network 140. Examples of such edge devices 202 may include routers, routing switches, integrated access devices (IADs), multiplexers, wide-area network (WAN) access devices, and network security appliances. In certain embodiments, the network 140 may be a private network (e.g., an enterprise network), a semi-public network (e.g., a service provider core network), or a public network (e.g., the Internet).

Skilled practitioners of the art will be aware that edge devices 202 are often implemented as routers that provide authenticated access to faster, more efficient backbone and core networks. Furthermore, current industry trends include making edge devices 202 more intelligent, which allows core devices to operate at higher speed as they are not burdened with additional administrative overhead. Accordingly, such edge devices 202 often include Quality of Service (QoS) and multi-service functions to manage different types of traffic. Consequently, it is common to design core networks with switches that use routing protocols such as Open Shortest Path First (OSPF) or Multiprotocol Label Switching (MPLS) for reliability and scalability. Such approaches allow edge devices 202 to have redundant links to the core network, which not only provides improved reliability, but enables enhanced, flexible, and scalable security capabilities as well.

In certain embodiments, the edge device 202 may be implemented to include a communications/services architecture 204, various pluggable capabilities 212, a traffic router 210, and a pluggable hosting framework 208. In certain embodiments, the communications/services architecture 202 may be implemented to provide access to and from various networks 140, cloud services 206, or a combination thereof. In certain embodiments, the cloud services 206 may be provided by a cloud infrastructure familiar to those of skill in the art. In certain embodiments, the edge device 202 may be implemented to provide support for a variety of generic services, such as directory integration, logging interfaces, update services, and bidirectional risk/context flows associated with various analytics. In certain embodiments, the edge device 202 may be implemented to provide temporal information, described in greater detail herein, associated with the provision of such services.

In certain embodiments, the edge device 202 may be implemented as a generic device configured to host various network communications, data processing, and security management capabilities. In certain embodiments, the pluggable hosting framework 208 may be implemented to host such capabilities in the form of pluggable capabilities 212. In certain embodiments, the pluggable capabilities 212 may include capability '1' 214 (e.g., basic firewall), capability '2' 216 (e.g., general web protection), capability '3' 218 (e.g., data sanitization), and so forth through capability 'n' 220, which may include capabilities needed for a particular operation, process, or requirement on an as-needed basis. In certain embodiments, such capabilities may include the performance of operations associated with managing an adaptive trust Profile (ATP), described in greater detail herein. In certain embodiments, such operations may include the provision of associated temporal information (e.g., time stamps).

In certain embodiments, the pluggable capabilities 212 may be sourced from various cloud services 206. In certain embodiments, the pluggable hosting framework 208 may be implemented to provide certain computing and communication infrastructure components, and foundation capabilities, required by one or more of the pluggable capabilities 212. In certain embodiments, the pluggable hosting framework 208 may be implemented to allow the pluggable capabilities 212 to be dynamically invoked. Skilled practitioners of the art will recognize that many such embodiments are possible. Accordingly, the foregoing is not intended to limit the spirit, scope or intent of the invention.

Figure 3:
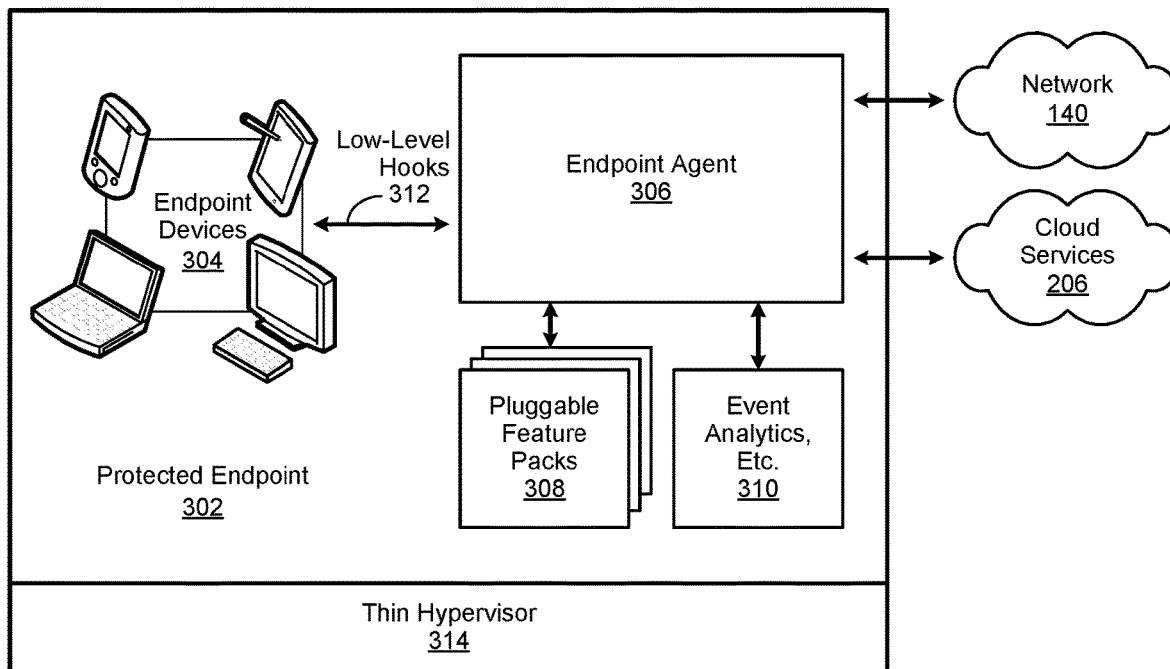
FIG. 3 is a simplified block diagram of an endpoint agent.

FIG. 3 is a simplified block diagram of an endpoint agent implemented in accordance with an embodiment of the invention. As used herein, an endpoint agent 306 broadly refers to a software agent used in combination with an endpoint device 304 to establish a protected endpoint 302. Skilled practitioners of the art will be familiar with software agents, which are computer programs that perform actions on behalf of a user or another program. In various approaches, a software agent may be autonomous or work together with another agent or a user. In certain of these approaches the endpoint agent is implemented to autonomously decide if a particular action is appropriate for a given event, such as an observed entity behavior. For example, in certain embodiments of the present invention, the endpoint agent can autonomously determine whether to trigger stimuli and observe additional entity behavior associated with an endpoint device.

An endpoint device 304, as likewise used herein, refers to an information processing system such as a personal computer, a laptop computer, a tablet computer, a personal digital assistant (PDA), a smart phone, a mobile telephone, a digital camera, a video camera, or other device capable of storing, processing and communicating data, such as information handling system 100. In certain embodiments, the communication of the data may take place in real-time or near-real-time. As used herein, real-time broadly refers to processing and providing information within a time interval brief enough to not be discernable by a user.

A protected endpoint 302 broadly refers to a policy-based approach to network security that typically requires endpoint devices 304 to comply with certain criteria before they are granted access to network resources. As an example, a given endpoint device 304 may be required to have a particular operating system (OS), or version thereof, a Virtual Private Network (VPN) client, anti-virus software with current updates, and so forth. In certain embodiments, the protected endpoint 302 may be implemented to perform operations associated with providing real-time resolution of the identity of an entity at a particular point in time, as described in greater detail below. In certain embodiments, the protected endpoint 302 may be implemented to provide temporal information, such as timestamp information, associated with such operations.

In certain embodiments, the real-time resolution of the identity of an entity at a particular point in time may be based upon contextual information associated with a given entity behavior. As used herein, contextual information broadly refers to any information, directly or indirectly, individually or in combination, related to a particular entity behavior. In certain embodiments, entity behavior may include an entity's physical behavior, cyber behavior, or a combination thereof. As likewise used herein, physical behavior broadly refers to any entity behavior occurring within a physical realm. More particularly, physical behavior may include any action enacted by an entity that can be objectively observed, or indirectly inferred, within a physical realm.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable entity behavior broadly refers to any behavior exhibited or enacted by an entity that can be electronically observed. As will be discussed more fully below, some embodiments of the present invention are triggered by certain physical and cyber behavior and are configured to generate additional information related to contextual information of an entity, such as a user.

Cyber behavior, as used herein, broadly refers to any behavior occurring in cyberspace, whether enacted by an individual user, a group of users, or a system acting at the behest of an individual user, a group of users, or an entity. More particularly, cyber behavior may include physical, social, or mental actions that can be objectively and electronically observed, or indirectly inferred, within cyberspace. As an example, a user may use an endpoint device 304 to access and browse a particular website on the Internet. In this example, the individual actions performed by the user to access and browse the website constitute a cyber behavior. As another example, a user may use an endpoint device 304 to download a data file from a particular system at a particular point in time. In this example, the individual actions performed by the user to download the data file, and associated temporal information, such as a time-stamp associated with the download, constitute a cyber behavior.

As likewise used herein, cyberspace broadly refers to a network 140 environment capable of supporting communication between two or more entities. In certain embodiments, the entity may be a user, an endpoint device 304, or various resources, described in greater detail herein. In certain embodiments, the entities may include various endpoint devices 304 or resources operating at the behest of an entity, such as a user. In certain embodiments, the communication between entities may include audio, image, video, text, or binary data.

As described in greater detail herein, the contextual information may include a user's authentication factors. Contextual information may likewise include various temporal identity resolution factors, such as identification factors associated with the entity, the date/time/frequency of various entity behaviors, the entity's location, the entity's role or position in an organization, their associated access rights, and certain user gestures employed by a user in the enactment of a user behavior. Other contextual information may likewise include various user interactions, whether the interactions are with an endpoint device 304, a network 140, a resource, or another user. In certain embodiments, entity behaviors, and their related contextual information, may be collected at particular points of observation, and at particular points in time, described in greater detail herein. In certain embodiments, a protected endpoint 302 may be implemented as a point of observation for the collection of entity behavior and contextual information.

In certain embodiments, endpoint agent 306 may be implemented to universally support a variety of operating systems. In certain embodiments, the endpoint agent may be implemented to interact with endpoint device 304 through the use of low-level hooks 312 at the operating system level. It will be appreciated that the use of low-level hooks allows the endpoint agent to subscribe to multiple events through a single hook. Consequently, multiple functionalities provided by endpoint agent 306 can share a single data stream, using only those portions of the data stream they may individually need. Accordingly, system efficiency can be improved and operational overhead reduced.

In certain embodiments, endpoint agent 306 may be implemented to provide a common infrastructure for pluggable feature packs 308. In various embodiments, the pluggable feature packs 308 may provide certain security management functionalities. Examples of such functionalities may include various anti-virus and malware detection, data loss protection (DLP), insider threat detection, and so forth. In certain embodiments, the security management functionalities can include a mechanism to develop additional information regarding entity activity context, as described in greater detail below.

In certain embodiments, a particular pluggable feature pack 308 is invoked as needed by endpoint agent 306 to provide a given functionality. In certain embodiments, individual features of a particular pluggable feature pack 308 are invoked as needed. It will be appreciated that the ability to invoke individual features of a pluggable feature pack 308, without necessarily invoking all such features, will likely improve the operational efficiency of the endpoint agent 306 while simultaneously reducing operational overhead. Accordingly, the endpoint agent 306 can self-optimize in certain embodiments by using the common infrastructure and invoking only those pluggable components that are applicable or needed for a given user behavior.

In certain embodiments, the individual features of a pluggable feature pack 308 are invoked by endpoint agent 306 according to the occurrence of a particular user behavior. In certain embodiments, the individual features of a pluggable feature pack 308 are invoked by the endpoint agent 306 according to the occurrence of a particular temporal event, described in greater detail herein. In certain embodiments, the individual features of a pluggable feature pack 308 are invoked by the endpoint agent 306 at a particular point in time. In these embodiments, the method by which a given user behavior, temporal event, or point in time is selected is a matter of design choice.

In certain embodiments, endpoint agent 306 may be implemented with additional functionalities, such as event analytics 310. In certain embodiments, the event analytics functionality may include analysis of various user behaviors, described in greater detail herein.

Figure 4:
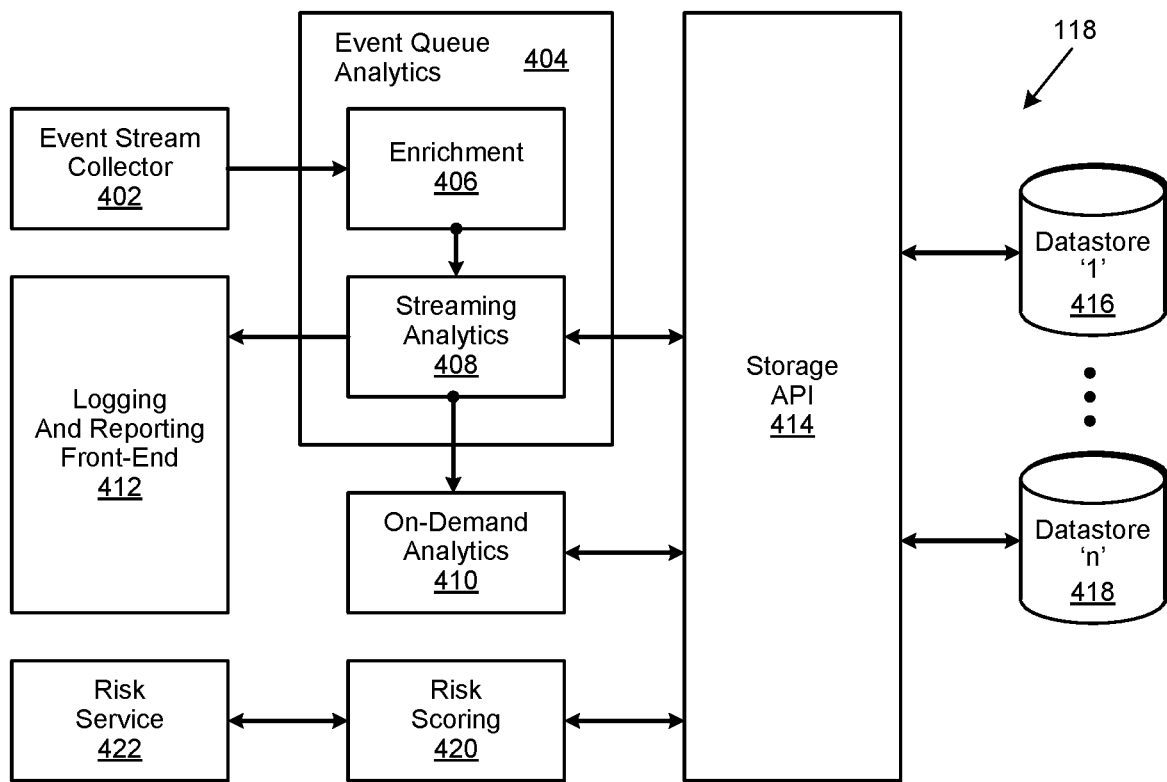
FIG. 4 is a simplified block diagram of a security analytics system.

FIG. 4 is a simplified block diagram of a security analytics system implemented in accordance with an embodiment of the invention. In certain embodiments, the security analytics system 118 shown in FIG. 4 may include an event queue analytics 404 sub-system, described in greater detail herein. In certain embodiments, event queue analytics 404 sub-system may be implemented to include an enrichment 406 module and a streaming analytics 408 module. In certain embodiments, the security analytics system 118 may be implemented to provide logging storage, reporting, and analytics capable of performing streaming 408 and on-demand 410 analytics operations. In certain embodiments, such operations may be associated with defining and managing an adaptive trust profile (ATP), detecting entity behavior that may be of analytic utility, adaptively responding to mitigate risk, or a combination thereof, as described in greater detail herein. In certain embodiments, entity behavior of analytic utility may be determined to be anomalous, abnormal, unexpected, malicious, or some combination thereof, as described in greater detail herein.

In certain embodiments, the security analytics system 118 may be implemented to provide a uniform platform for storing events and contextual information associated with various entity behaviors and performing longitudinal analytics. As used herein, longitudinal analytics broadly refers to performing analytics of entity behaviors occurring over a particular period of time. As an example, an entity may iteratively attempt to access certain proprietary information stored in various locations. In addition, the attempts may occur over a brief period of time. To continue the example, the fact that the information the entity is attempting to access is proprietary, that it is stored in various locations, and the attempts are occurring in a brief period of time, in combination, may indicate the entity behavior enacted by the entity is suspicious. As another example, certain entity identifier information (e.g., a user name) associated with an entity may change over time. In this example, a change in the entity's user name, during a particular period of time or at a particular point in time, may represent suspicious entity behavior.

In certain embodiments, the security analytics system 118 may be implemented to be scalable. In certain embodiments, the security analytics system 118 may be implemented in a centralized location, such as a corporate data center. In these embodiments, additional resources may be added to the security analytics system 118 as needs grow. In certain embodiments, the security analytics system 118 may be implemented as a distributed system. In these embodiments, the security analytics system 118 may span multiple information handling systems. In certain embodiments, the security analytics system 118 may be implemented in a cloud environment. In certain embodiments, the security analytics system 118 may be implemented in a virtual machine (VM)

environment. In such embodiments, the VM environment may be configured to dynamically and seamlessly scale the security analytics system 118 as needed. Skilled practitioners of the art will recognize that many such embodiments are possible. Accordingly, the foregoing is not intended to limit the spirit, scope or intent of the invention.

In certain embodiments, an event stream collector 402 can be implemented to collect event and related contextual information, described in greater detail herein, associated with various entity behaviors. In these embodiments, the method by which the event and contextual information is selected to be collected by the event stream collector 402 is a matter of design choice. In certain embodiments, the event and contextual information collected by the event stream collector 402 may be processed by an enrichment module 406 to generate enriched entity behavior information. In certain embodiments, the enrichment may include certain contextual information related to a particular entity behavior or event. In certain embodiments, the enrichment may include certain temporal information, such as timestamp information, related to a particular entity behavior or event.

In certain embodiments, enriched entity behavior information may be provided by the enrichment module 406 to a streaming 408 analytics module. In turn, the streaming 408 analytics module may provide some or all of the enriched entity behavior information to an on-demand 410 analytics module. As used herein, streaming 408 analytics broadly refers to analytics performed in near real-time on enriched entity behavior information as it is received. Likewise, on-demand 410 analytics broadly refers herein to analytics performed, as they are requested, on enriched entity behavior information after it has been received. In certain embodiments, the enriched entity behavior information may be associated with a particular event. In certain embodiments, the enrichment 406 and streaming analytics 408 modules may be implemented to perform event queue analytics 404 operations, as described in greater detail herein.

In certain embodiments, the on-demand 410 analytics may be performed on enriched entity behavior associated with a particular interval of, or point in, time. In certain embodiments, the streaming 408 or on-demand 410 analytics may be performed on enriched entity behavior associated with a particular user, group of users, one or more non-user entities, or a combination thereof. In certain embodiments, the streaming 408 or on-demand 410 analytics may be performed on enriched entity behavior associated with a particular resource, such as a facility, system, datastore, or service. Those of skill in the art will recognize that many such embodiments are possible. Accordingly, the foregoing is not intended to limit the spirit, scope or intent of the invention.

In certain embodiments, the results of various analytics operations performed by the streaming 408 or on-demand 410 analytics modules may be provided to a storage Application Program Interface (API) 414. In turn, the storage API 412 may be implemented to provide access to various datastores '1' 416 through 'n' 418, which in turn are used to store the results of the analytics operations. In certain embodiments, the security analytics system 118 may be implemented with a logging and reporting front-end 412, which is used to receive the results of analytics operations performed by the streaming 408 analytics module. In certain embodiments, the datastores '1' 416 through 'n' 418 may variously include a datastore of entity identifiers, temporal events, or a combination thereof.

In certain embodiments, the security analytics system 118 may include a risk scoring 420 module implemented to perform risk scoring operations, described in greater detail herein. In certain embodiments, functionalities of the risk scoring 420 module may be provided in the form of a risk management service 422. In certain embodiments, the risk management service 422 may be implemented to perform operations associated with defining and managing an adaptive trust profile (ATP), as described in greater detail herein. In certain embodiments, the risk management service 422 may be implemented to perform operations associated with detecting entity behavior that may be of analytic utility and adaptively responding to mitigate risk, as described in greater detail herein. In certain embodiments, the risk management service 422 may be implemented to provide results of various analytics operations performed by the streaming 406 or on-demand 408 analytics modules. In certain embodiments, the risk management service 422 may be implemented to use the storage API 412 to access various enhanced cyber behavior and analytics information stored on the datastores '1' 414 through 'n' 416. Skilled practitioners of the art will recognize that many such embodiments are possible. Accordingly, the foregoing is not intended to limit the spirit, scope or intent of the invention.

Figure 5:
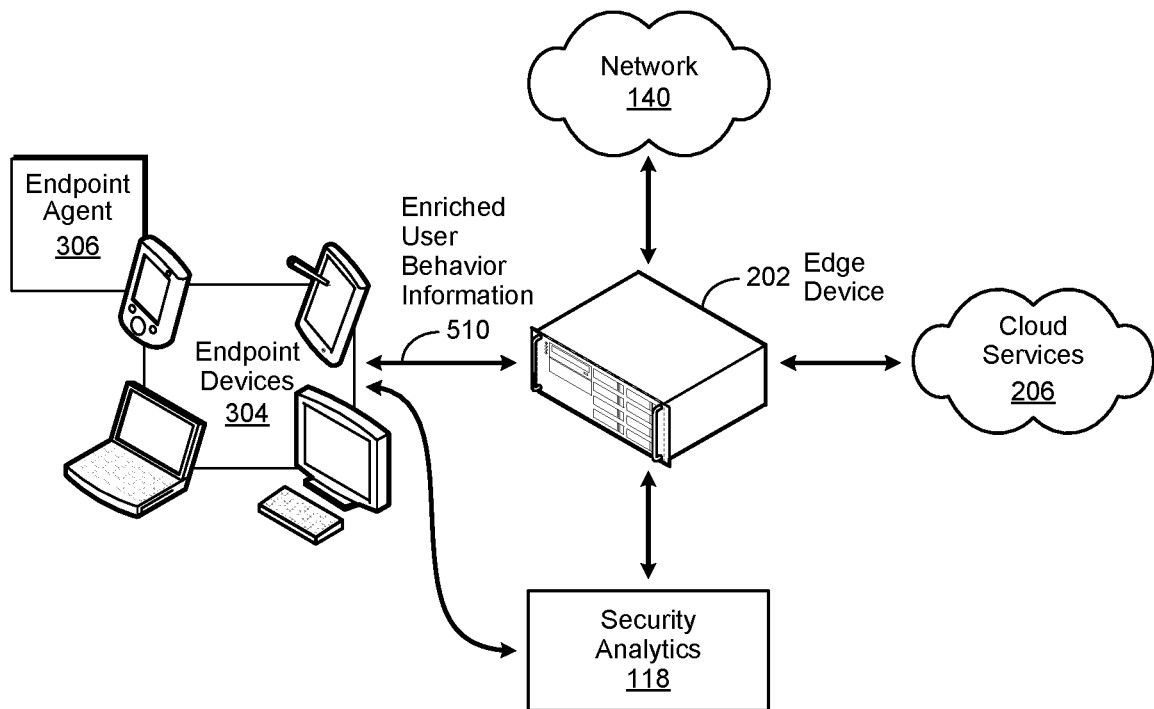
FIG. 5 is a simplified block diagram of a security analytics system.

FIG. 5 is a simplified block diagram of the operation of a security analytics system implemented in accordance with an embodiment of the invention. In certain embodiments, security analytics system 118 may be implemented to perform operations associated with detecting entity behavior that may be of analytic utility, as described in greater detail herein. In certain embodiments, security analytics system 118 may be implemented in combination with one or more endpoint agents 306, one or more edge devices 202, various cloud services 206, and a network 140 to perform such operations.

In certain embodiments, the network edge device 202 may be implemented in a bridge, a firewall, or a passive monitoring configuration. In certain embodiments, the edge device 202 may be implemented as software running on an information handling system. In certain embodiments, the network edge device 202 may be implemented to provide integrated logging, updating and control. In certain embodiments, the edge device 202 may be implemented to receive network requests and context-sensitive user behavior information in the form of enriched user behavior information 510, described in greater detail herein, from an endpoint agent 306, likewise described in greater detail herein.

In certain embodiments, the security analytics system 118 may be implemented as both a source and a sink of user behavior information. In certain embodiments, the security analytics system 118 may be implemented to serve requests for user/resource risk data. In certain embodiments, the edge device 202 and the endpoint agent 306, individually or in combination, may provide certain entity behavior information to the security analytics system 118 using either push or pull approaches familiar to skilled practitioners of the art.

As described in greater detail herein, the edge device 202 may be implemented in certain embodiments to receive enriched user behavior information 510 from the endpoint agent 306. It will be appreciated that such enriched user behavior information 510 will likely not be available for provision to the edge device 202 when an endpoint agent 306 is not implemented for a corresponding endpoint device 304. However, the lack of such enriched user behavior information 510 may be accommodated in various embodiments, albeit with reduced functionality related to operations associated with defining and managing an entity profile, detecting entity behavior that may be normal or of analytic utility, mitigating associated risk, or a combination thereof.

In certain embodiments, a given user behavior may be enriched by an associated endpoint agent 306 attaching contextual information to a request. In certain embodiments, the context is embedded within a network request, which is then provided as enriched user behavior information 510. In certain embodiments, the contextual information may be concatenated, or appended, to a request, which in turn may be provided as enriched user behavior information 510. In these embodiments, the enriched user behavior information 510 may be unpacked upon receipt and parsed to separate the request and its associated contextual information. Certain embodiments of the invention reflect an appreciation that one possible disadvantage of such an approach is that it may perturb certain Intrusion Detection System and/or Intrusion Detection Prevention (IDS/IDP) systems implemented on a network 140.

In certain embodiments, new flow requests may be accompanied by a contextual information packet sent to the edge device 202. In these embodiments, the new flow requests may be provided as enriched user behavior information 510. In certain embodiments, the endpoint agent 306 may also send updated contextual information to the edge device 202 once it becomes available. As an example, an endpoint agent 306 may share a list of files that have been read by a current process at any point in time once the information has been collected. To continue the example, such a list of files may be used to determine which data the endpoint agent 306 may be attempting to exfiltrate.

In certain embodiments, point analytics processes executing on the edge device 202 may request a particular service. As an example, risk scores associated with a particular event on a per-user basis may be requested. In certain embodiments, the service may be requested from the security analytics system 118. In certain embodiments, the service may be requested from various cloud services 206.

In certain embodiments, contextual information associated with a particular entity behavior may be attached to various network service requests. In certain embodiments, the request may be wrapped and then handled by proxy. In certain embodiments, a small packet of contextual information associated with an entity behavior may be sent with a service request. In certain embodiments, service requests may be related to Domain Name Service (DNS), web browsing activity, email, and so forth, all of which are essentially requests for service by an endpoint device 304. In certain embodiments, such service requests may be associated with temporal event information, described in greater detail herein. Consequently, such requests can be enriched by the addition of entity behavior contextual information (e.g., UserAccount, interactive/automated, data-touched, temporal event information, etc.). Accordingly, the edge device 202 can then use this information to manage the appropriate response to submitted requests.

In certain embodiments, the endpoint agent 306 may be implemented to update the security analytics system 118 with user behavior and associated contextual information, thereby allowing an offload of certain analytics processing overhead. In certain embodiments, this approach allows for longitudinal risk scoring, which assesses risk associated with certain user behavior during a particular interval of time. In certain embodiments, the security analytics system 118 may be implemented to access risk scores associated with the same user account, but accrued on different endpoint devices 304. It will be appreciated that such an approach may prove advantageous when an adversary is "moving sideways" through a network environment, using different endpoint devices 304 to collect information.

In certain embodiments, the security analytics system 118 may be primarily oriented to applying risk mitigations in a way that maximizes security effort return-on-investment (ROI). In certain embodiments, this approach may be accomplished by providing additional contextual and entity behavior information associated with entity requests. As an example, a web gateway may not concern itself with why a particular file is being requested by a certain entity at a particular point in time. Accordingly, if the file cannot be identified as malicious or harmless, there is no context available to determine how, or if, to proceed. To extend the example, the edge device 202 and security analytics system 118 may be coupled such that requests can be contextualized and fitted into a framework that evaluates their associated risk. Certain embodiments of the invention reflect an appreciation that such an approach works well with web-based data loss protection (DLP) approaches, as each transfer is no longer examined in isolation, but in the broader context of an identified entity's actions, at a particular time, on the network 140.

As another example, the security analytics system 118 may be implemented to perform risk scoring processes to decide whether to block or allow unusual flows. In various embodiments, the risk scoring processes may be implemented to include certain aspects of eXtensible Access Control Markup Language (XACML) approaches known to skilled practitioners of the art. In certain embodiments, XACML obligations may be implemented to block or allow unusual flows. In certain embodiments, an XACML obligation may be implemented as a directive from a policy decision point (PDP) to a policy enforcement point (PEP) regarding what must be performed before or after a flow is approved.

In certain embodiments, the security analytics system 118 may be primarily oriented to maximally leverage contextual information associated with various entity behaviors within the system. In certain embodiments, data flow tracking is performed by one or more endpoint agents 306, which allows the quantity and type of information associated with particular hosts to be measured. In turn, this information may be used to determine how the edge device 202 handles requests. In certain embodiments, contextual information regarding an event can be further developed through actively applying stimuli to a user entity thereby triggering additional events that can be provided to risk scoring 420 module for evaluation.

By contextualizing such entity behavior on the network 140, the security analytics system 118 can provide intelligent protection, making decisions that make sense in the broader context of an organization's activities. Certain embodiments of the invention reflect an appreciation that one advantage to such an approach is that information flowing through an organization, and the networks they employ, should be trackable, and substantial data breaches preventable. Skilled practitioners of the art will recognize that many such embodiments and examples are possible. Accordingly, the foregoing is not intended to limit the spirit, scope or intent of the invention.

Figure 6:
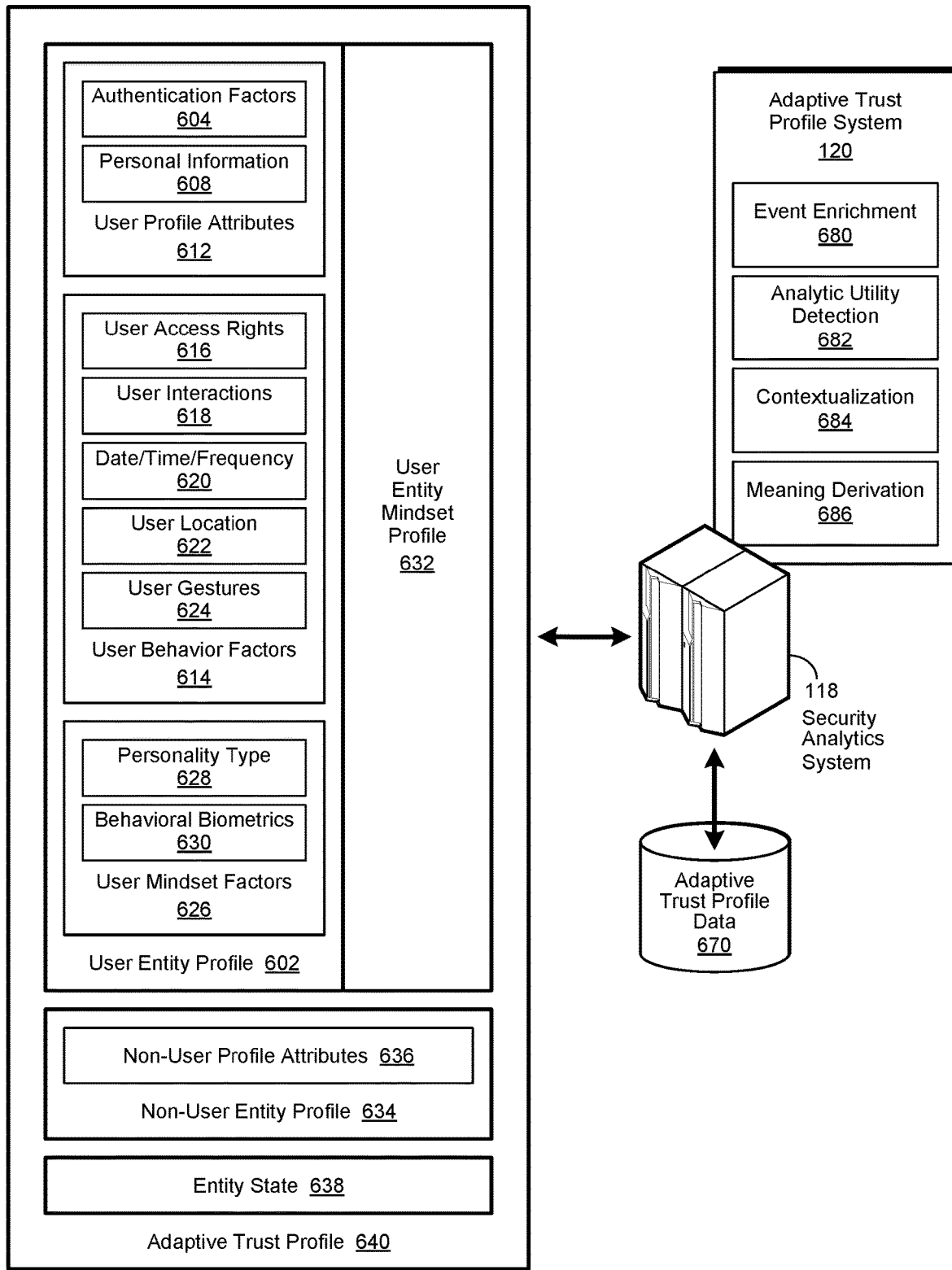
FIG. 6 is a simplified block diagram of an adaptive trust profile (ATP)

FIG. 6 is a simplified block diagram of an adaptive trust profile implemented in accordance with an embodiment of the invention. As used herein, an adaptive trust profile (ATP) 640 broadly refers to a collection of information that uniquely describes an entity's identity and their associated behavior, whether the behavior occurs within a physical realm or cyberspace. In certain embodiments, an ATP may be used to adaptively draw inferences regarding the trustworthiness of an entity. In certain embodiments, as described in greater detail herein, the drawing of the inferences may involve comparing a new entity behavior to known past behaviors enacted by the entity. In certain embodiments, new entity behavior of analytic utility may represent entity behavior that represents a security risk. As likewise used herein, an entity broadly refers to something that exists as itself, whether physically or abstractly. In certain embodiments, an entity may be a user entity, a non-user entity, or a combination thereof. In certain embodiments, the identity of an entity may be known or unknown.

As used herein, a user entity broadly refers to an entity capable of enacting a user behavior, as described in greater detail herein. Examples of a user entity include an individual person, a group of people, an organization, or a government. As likewise used herein, a non-user entity broadly refers to an entity whose identity can be described and may exhibit certain behavior, but is incapable of enacting a user behavior. Examples of a non-user entity include an item, a device, such as endpoint and edge devices, a network, an account, a domain, an operation, and a process. Other examples of a non-user entity include a resource, such as a geographical location or formation, a physical facility, a venue, a system, a software application, a data store, and a service, such as a service operating in a cloud environment.

Certain embodiments of the invention reflect an appreciation that being able to uniquely identity a device may assist in establishing whether or not a particular login is legitimate. As an example, user impersonations may not occur at the user's endpoint, but rather, from another device or system. Certain embodiments of the invention likewise reflect an appreciation that profiling the behavior of a particular device or system may assist in determining whether or not it is acting suspiciously.

In certain embodiments, an account may be local account, which runs on a single machine. In certain embodiments, an account may be a global account, providing access to multiple resources. In certain embodiments, a process may be implemented to run in an unattended mode, such as when backing up files or checking for software updates. Certain embodiments of the invention reflect an appreciation that it is often advantageous to track events at the process level as a method of determining which events are associated with background processes and which are initiated by a user entity.

In certain embodiments, an ATP 640 may be implemented to include a user entity profile 602, an associated user entity mindset profile 632, a non-user entity profile 634, and an entity state 638. As used herein, a user entity profile 602 broadly refers to a collection of information that uniquely describes a user entity's identity and their associated behavior, whether the behavior occurs within a physical realm or cyberspace. In certain embodiments, as described in greater detail herein, the user entity profile 602 may include user profile attributes 612, user behavior factors 614, user mindset factors 626, or a combination thereof. In certain embodiments, the user profile attributes 612 may include certain user authentication factors 604, described in greater detail herein, and personal information 608.

As used herein, a user profile attribute 612 broadly refers to data or metadata that can be used, individually or in combination with other user profile attributes 612, user behavior factors 614, or user mindset factors 626, to ascertain the identity of a user entity. In various embodiments, certain user profile attributes 612 may be uniquely associated with a particular user entity. In certain embodiments, the personal information 608 may include non-sensitive personal information associated with a user entity, such as their name, title, position, role, and responsibilities. In certain embodiments, the personal information 608 may likewise include technical skill level information, peer information, expense account information, paid time off (PTO) information, data analysis information, insider information, misconfiguration information, third party information, or a combination thereof. In certain embodiments, the personal information 608 may contain sensitive personal information associated with a user entity. As used herein, sensitive personal information (SPI), also commonly referred to as personally identifiable information (PII), broadly refers to any information usable to ascertain the identity of a user entity, either by itself, or in combination with other information, such as contextual information described in greater detail herein.

Examples of SPI may include the full or legal name of a user entity, initials or nicknames, place and date of birth, home and business addresses, personal and business telephone numbers, their gender, and other genetic information. Additional examples of SPI may include government-issued identifiers, such as a Social Security Number (SSN) or a passport number, vehicle registration plate and serial numbers, and driver's license numbers. Other examples of SPI may include certain email addresses and social media identifiers, credit and debit card numbers, and other digital identity information. Yet other examples of SPI may include employer-issued identifiers, financial transaction information, credit scores, electronic medical records (EMRs), insurance claim information, personal correspondence, and so forth. Further examples of SPI may include user authentication factors 604, such as biometrics, user identifiers and passwords, and personal identification numbers (PINs).

In certain embodiments, the SPI may include information considered by an individual user, a group of users, or an organization (e.g., a company, a government or non-government organization, etc.), to be confidential or proprietary. One example of such confidential information is protected health information (PHI). As used herein, PHI broadly refers to any information associated with the health status, provision of health care, or payment for health care that is created or collected by a "covered entity," or an associate thereof, that can be linked to a particular individual. As used herein, a "covered entity" broadly refers to health plans, healthcare clearinghouses, healthcare providers, and others, who may electronically communicate any health-related information associated with a particular individual. Examples of such PHI may include any part of a patient's medical record, healthcare record, or payment history for medical or healthcare services.

As used herein, a user behavior factor 614 broadly refers to information associated with a user entity's behavior, whether the behavior occurs within a physical realm or cyberspace. In certain embodiments, user behavior factors 614 may include the user entity's access rights 616, the user entity's interactions 618, and the date/time/frequency 620 of when the interactions 618 are enacted. In certain embodiments, the user behavior factors 614 may likewise include the user entity's location 622, and the gestures 624 used by the user entity to enact the interactions 618.

In certain embodiments, the user entity gestures 624 may include key strokes on a keypad, a cursor movement, a mouse movement or click, a finger swipe, tap, or other hand gesture, an eye movement, or some combination thereof. In certain embodiments, the user entity gestures 624 may likewise include the cadence of the user's keystrokes, the motion, force and duration of a hand or finger gesture, the rapidity and direction of various eye movements, or some combination thereof. In certain embodiments, the user entity gestures 624 may include various audio or verbal commands performed by the user.

As used herein, user mindset factors 626 broadly refer to information used to make inferences regarding the mental state of a user entity at a particular point in time, during the occurrence of an event or an enactment of a user behavior, or a combination thereof. As likewise used herein, mental state broadly refers to a hypothetical state corresponding to the way a user entity may be thinking or feeling. Likewise, as used herein, an event broadly refers to the occurrence of action performed by an entity. In certain embodiments, the user entity mindset factors 626 may include a personality type 628. Examples of known approaches for determining a personality type 628 include Jungian types, Myers-Briggs type indicators, Keirsy Temperament Sorter, Socionics, Enneagram of Personality, and Eyseneck's three-factor model.

In certain embodiments, the user mindset factors 626 may include various behavioral biometrics 630. As used herein, a behavioral biometric 630 broadly refers to a physiological indication of a user entity's mental state. Examples of behavioral biometrics 630 may include a user entity's blood pressure, heart rate, respiratory rate, eye movements and iris dilation, facial expressions, body language, tone and pitch of voice, speech patterns, and so forth.

Certain embodiments of the invention reflect an appreciation that certain user behavior factors 614, such as user entity gestures 624, may provide additional information related to inferring a user entity's mental state. As an example, a user entering text at a quick pace with a rhythmic cadence may indicate intense focus. Likewise, an individual user intermittently entering text with forceful keystrokes may indicate the user is in an agitated state. As another example, the user may intermittently enter text somewhat languorously, which may indicate being in a thoughtful or reflective state of mind. As yet another example, the user may enter text with a light touch with an uneven cadence, which may indicate the user is hesitant or unsure of what is being entered.

Certain embodiments of the invention likewise reflect an appreciation that while the user entity gestures 624 may provide certain indications of the mental state of a particular user entity, they may not provide the reason for the user entity to be in a particular mental state. Likewise, certain embodiments of the invention include an appreciation that certain user entity gestures 624 and behavioral biometrics 630 are reflective of an individual user's personality type 628. As an example, aggressive, forceful keystrokes combined with an increased heart rate may indicate normal behavior for a particular user when composing end-of-month performance reviews. In various embodiments, certain user entity behavior factors 614, such as user gestures 624, may be correlated with certain contextual information, as described in greater detail herein.

In certain embodiments, a security analytics system 118, described in greater detail herein, may be implemented to include an adaptive trust profile (ATP) system 120. In certain embodiments, the ATP system 120 may be implemented to use a user entity profile 602 in combination with an entity state 638 to generate a user entity mindset profile 632. As used herein, entity state 638 broadly refers to the context of a particular event or entity behavior. In certain embodiments, the entity state 638 may be a long-term entity state or a short-term entity state. As used herein, a long-term entity state 638 broadly relates to an entity state 638 that persists for an extended interval of time, such as six months or a year.

As likewise used herein, a short-term entity state 638 broadly relates to an entity state 638 that occurs for a brief interval of time, such as a few minutes or a day. In various embodiments, the method by which an entity state's 638 associated interval of time is considered to be long-term or short-term is a matter of design choice.

As an example, a particular user may have a primary work location, such as a branch office, and a secondary work location, such as their company's corporate office. In this example, the user's primary and secondary offices respectively correspond to the user's location 622, whereas the presence of the user at either office corresponds to an entity state 638. To continue the example, the user may consistently work at their primary office Monday through Thursday, but at their company's corporate office on Fridays. To further continue the example, the user's presence at their primary work location may be a long-term entity state 638, while their presence at their secondary work location may be a short-term entity state 638. Accordingly, a date/time/frequency 620 user entity behavior factor 614 can likewise be associated with user behavior respectively enacted on those days, regardless of their corresponding locations. Consequently, the long-term user entity state 638 on Monday through Thursday will typically be "working at the branch office" and the short-term entity state 638 on Friday will likely be "working at the corporate office."

As likewise used herein, a user entity mindset profile 632 broadly refers to a collection of information that reflects an inferred mental state of a user entity at a particular time during the occurrence of an event or an enactment of a user behavior. As an example, certain information may be known about a user entity, such as their name, their title and position, and so forth, all of which are user profile attributes 612. Likewise, it may be possible to observe a user entity's associated user behavior factors 614, such as their interactions with various systems, when they log-in and log-out, when they are active at the keyboard, the rhythm of their keystrokes, and which files they typically use.

Certain embodiments of the invention reflect an appreciation these behavior factors 614 can be considered to be a behavioral fingerprint. In certain embodiments, the user behavior factors 614 may change, a little or a lot, from day to day. These changes may be benign, such as when a user entity begins a new project and accesses new data, or they may indicate something more concerning, such as a user entity who is actively preparing to steal data from their employer. In certain embodiments, the user behavior factors 614 may be implemented to ascertain the identity of a user entity. In certain embodiments, the user behavior factors 614 may be uniquely associated with a particular entity.

In certain embodiments, observed user behaviors may be used to build a user entity profile 602 for a particular user or other entity. In addition to creating a model of a user's various attributes and observed behaviors, these observations can likewise be used to infer things that are not necessarily explicit. Accordingly, in certain embodiments, a behavioral fingerprint may be used in combination with an ATP 640 to generate an inference regarding an associated user entity. As an example, a particular user may be observed eating a meal, which may or may not indicate the user is hungry. However, if it is also known that the user worked at their desk throughout lunchtime and is now eating a snack during a mid-afternoon break, then it can be inferred they are indeed hungry.

As likewise used herein, a non-user entity profile 634 broadly refers to a collection of information that uniquely describes a non-user entity's identity and their associated behavior, whether the behavior occurs within a physical realm or cyberspace. In various embodiments, the non-user entity profile 634 may be implemented to include certain non-user profile attributes 636. As used herein, a non-user profile attribute 636 broadly refers to data or metadata that can be used, individually or in combination with other non-user profile attributes 636, to ascertain the identity of a non-user entity. In various embodiments, certain non-user profile attributes 636 may be uniquely associated with a particular non-user entity.

In certain embodiments, the non-user profile attributes 636 may be implemented to include certain identity information, such as a non-user entity's network, Media Access Control (MAC), or physical address, its serial number, associated configuration information, and so forth. In various embodiments, the non-user profile attributes 636 may be implemented to include non-user behavior information associated with interactions between certain user and non-user entities, the type of those interactions, the data exchanged during the interactions, the date/time/frequency of such interactions, and certain services accessed or provided.

In certain embodiments, the ATP system 120 may be implemented to include an event enrichment 680 module, an anomaly detection 682 module, a contextualization 684 module, and a meaning derivation 686 module, or a combination thereof. In various embodiments, the event enrichment 680 module may be implemented to perform certain event enrichment operations, described in greater detail herein. In various embodiments, the anomaly detection 682 module may be implemented to perform certain anomaly detection, and other analytic operations, as likewise described in greater detail herein. In various embodiments, as described in greater detail herein, the contextualization 684 module may be implemented to perform certain contextualization operations. As likewise described in greater detail herein, the meaning derivation 686 module may be implemented to perform certain meaning derivation operations. In various embodiments, the event enrichment 680 module, the meaning derivation 686 module, the contextualization 684 module, and the analytic utility detection 686 module provide an ATP reference architecture for performing various ATP operations, described in greater detail herein.

In various embodiments, as described in greater detail herein, the ATP system 120 may be implemented to use certain data associated with an ATP 640 to derive an inference for contextualizing an electronically-observable behavior of a corresponding entity. In certain embodiments, the ATP system 120 may be implemented to use a user entity profile 602 in combination with a user entity mindset profile 632 and an associated entity state 638 to infer a user entity's intent. In certain embodiments, the ATP system 120 may be implemented to use various data stored in a repository of ATP data 670 to perform such an inference. In certain embodiments, the repository of ATP data 670 may include various ATPs 640 and associated contextual information, described in greater detail herein.

In various embodiments, the ATP system 120 may be implemented to use certain data associated with an ATP 640 to provide a probabilistic measure of whether a particular electronically-observable event is of analytic utility. In certain embodiments, an electronically-observable event that is of analytic utility may be determined to be anomalous, abnormal, unexpected, or malicious. To continue the prior example, a user may typically work out of their company's corporate office on Fridays. Furthermore, various mindset factors 626 within their associated user entity profile 602 may indicate that the user is typically relaxed and methodical when working with customer data. Moreover, the user's user entity profile 602 indicates that such interactions 618 with customer data typically occur on Monday mornings and the user rarely, if ever, copies or downloads customer data. However, the user may decide to interact with certain customer data late at night, on a Friday, while in their company's corporate office. As they do so, they exhibit an increased heart rate, rapid breathing, and furtive keystrokes while downloading a subset of customer data to a flash drive.

Consequently, their user entity mindset profile 632 may reflect a nervous, fearful, or guilty mindset, which is inconsistent with the entity state 638 of dealing with customer data in general. More particularly, downloading customer data late at night on a day the user is generally not in their primary office results in an entity state 638 that is likewise inconsistent with the user's typical user behavior. As a result, the ATP system 120 may infer that the user's behavior may represent a security threat. In some embodiments, ATP system 120 can further investigate the state of the user entity mindset by providing additional stimuli to the user entity and observing the reactions of the user entity, as will be discussed more fully below. Those of skill in the art will recognize that many such embodiments and examples are possible. Accordingly, the foregoing is not intended to limit the spirit, scope or intent of the invention.

Figure 7:
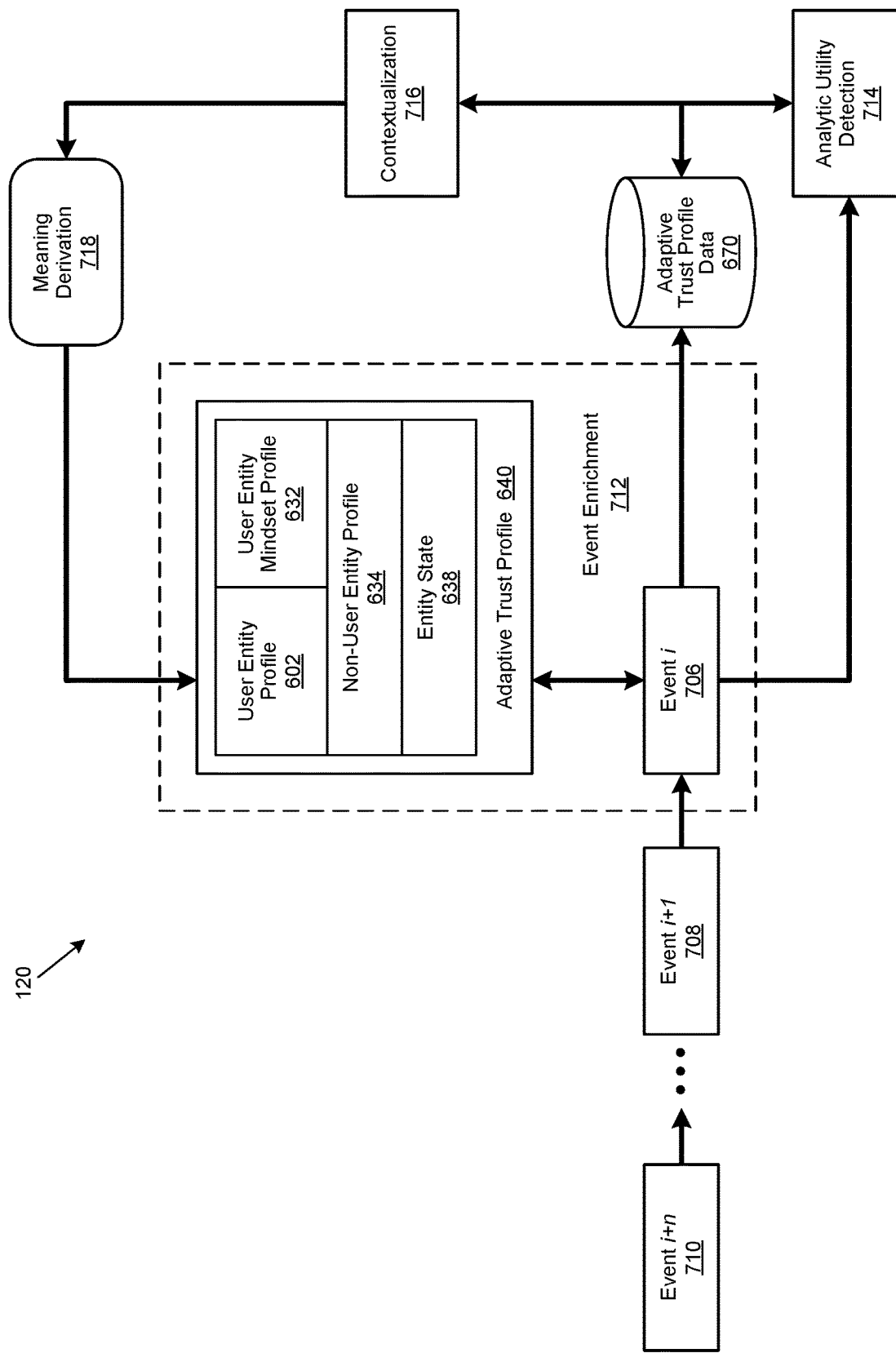
FIG. 7 is simplified block diagram of process flows associated with the operation of an ATP system.

FIG. 7 is simplified block diagram of process flows associated with the operation of an adaptive trust profile (ATP) system implemented in accordance with an embodiment of the invention. In certain embodiments, the ATP system 120 may be implemented to define and manage an ATP 640. In certain embodiments, the ATP 640 may be implemented to comprise a user entity profile 602. In certain embodiments, the ATP system 120 may be implemented to use the resulting user entity profile 602 in combination with a particular entity state 638 to generate a user entity mindset profile 632. In certain embodiments, the ATP system 120 may be implemented to use the resulting user entity mindset profile 632 in combination with an associated user entity profile 602, non-user entity profile 634, and entity state 638 to detect entity behavior of analytic utility.

In certain embodiments, the ATP system 120 may be implemented to process certain entity information associated with defining and managing an ATP 640. As used herein, entity information broadly refers to information associated with a particular entity. In various embodiments, the entity information may include certain types of content. In certain embodiments, such content may include text, unstructured data, structured data, graphical images, photographs, audio recordings, video recordings, biometric information, and so forth. In certain embodiments, the entity information may include metadata. In certain embodiments, the metadata may include entity attributes, which in turn may include certain entity identifier types or classifications.

In various embodiments, the ATP system 120 may be implemented to use certain entity identifier information to ascertain the identity of an associated entity at a particular point in time. As used herein, entity identifier information broadly refers to an information element associated with an entity that can be used to ascertain or corroborate the identity of its corresponding entity at a particular point in time. In certain embodiments, the entity identifier information may include user authentication factors, user profile attributes, user behavior factors, user mindset factors, information associated with various endpoint and edge devices, networks, resources, or a combination thereof.

In certain embodiments, the entity identifier information may include temporal information. As used herein, temporal information broadly refers to a measure of time (e.g., a date, timestamp, etc.), a measure of an interval of time (e.g., a minute, hour, day, etc.), or a measure of an interval of time (e.g., two consecutive weekdays days, or between Jun. 3, 2017 and Mar. 4, 2018, etc.). In certain embodiments, the temporal information may be associated with an event associated with a particular point in time. As used herein, such a temporal event broadly refers to an occurrence, action or activity enacted by, or associated with, an entity at a particular point in time.

Examples of such temporal events include making a phone call, sending a text or an email, using a device, such as an endpoint device, accessing a system, and entering a physical facility. Other examples of temporal events include uploading, transferring, downloading, modifying, or deleting data, such as data stored in a datastore, or accessing a service. Yet other examples of temporal events include interactions between two or more users, interactions between a user and a device, interactions between a user and a network, and interactions between a user and a resource, whether physical or otherwise. Yet still other examples of temporal events include a change in name, address, physical location, occupation, position, role, marital status, gender, association, affiliation, or assignment.

As likewise used herein, temporal event information broadly refers to temporal information associated with a particular event. In various embodiments, the temporal event information may include certain types of content. In certain embodiments, such types of content may include text, unstructured data, structured data, graphical images, photographs, audio recordings, video recordings, and so forth. In certain embodiments, the entity information may include metadata. In various embodiments, the metadata may include temporal event attributes, which in turn may include certain entity identifier types or classifications, described in greater detail herein.

In certain embodiments, the ATP system 120 may be implemented to use information associated with such temporal resolution of an entity's identity to assess the risk associated with a particular entity, at a particular point in time, and adaptively respond with an associated response, including developing additional contextual information related to the entity and event. In certain embodiments, the ATP system 120 may be implemented to respond to such assessments in order to reduce operational overhead and improve system efficiency while maintaining security integrity. In certain embodiments, the response to such assessments may be performed by a security administrator. Accordingly, certain embodiments of the invention may be directed towards assessing the risk associated with the affirmative resolution of the identity of an entity at a particular point in time in combination with its associated contextual information. Consequently, the ATP system 120 may be more oriented in various embodiments to risk adaptation than to security administration.

In certain embodiments, ATP 640 definition and management operations are begun with the receipt of information associated with event i 706. In certain embodiments, information associated with an initial event i 706 may include user profile attributes, user behavior factors, user mindset factors, entity state information, contextual information, described in greater detail herein, or a combination thereof. In various embodiments, certain user entity profile 602, user entity mindset profile 632, non-user entity profile 634, and entity state 638 data stored in a repository of ATP data 670 may be retrieved and then used to perform event enrichment 712 operations to enrich the information associated with event i 706. In certain embodiment, event enrichment 712 operations are performed by the event enrichment module 680 of the ATP system 120. Anomaly detection 714 operations are then performed on the resulting enriched information associated with event i 706 to determine whether it is of analytic utility. In certain embodiments, anomaly detection 714 operations are performed by the anomaly detection module 682 of the ATP system 120.

In various embodiments, certain contextualization information stored in the repository of ATP data 670 may be retrieved and then used to perform contextualization 716 operations to provide context, based upon the entity's user entity profile 602 or non-user entity profile 634, and its associated entity state 638. In certain embodiments, contextualization 716 operations are performed by the contextualization module 684 of the ATP system 120. In certain embodiments, meaning derivation 718 operations are then performed on the contextualized information associated with event i 706 to derive meaning. In certain embodiments, meaning derivation 718 operations are performed by the meaning derivation module 686 of the ATP system. In certain embodiments, the derivation of meaning may include inferring the intent of an entity associated with event i 706. In certain embodiments, the resulting information associated with event i 706 is then used to update the user entity profile 602 or non-user entity profile 634 corresponding to the entity associated with event i 706. In certain embodiments, the process is iteratively repeated, proceeding with information associated with event i+1 708 through event i+n 710.

From the foregoing, skilled practitioners of the art will recognize that a user entity profile 602, or a non-user entity profile 634, or the two in combination, as implemented in certain embodiments, not only allows the identification of events associated with a particular entity that may be of analytic utility, but also provides higher-level data that allows for the contextualization of observed events. Accordingly, by viewing individual sets of events both in context and with a view to how they may be of analytic utility, it is possible to achieve a more nuanced and higher-level comprehension of an entity's intent.

Figure 8A:
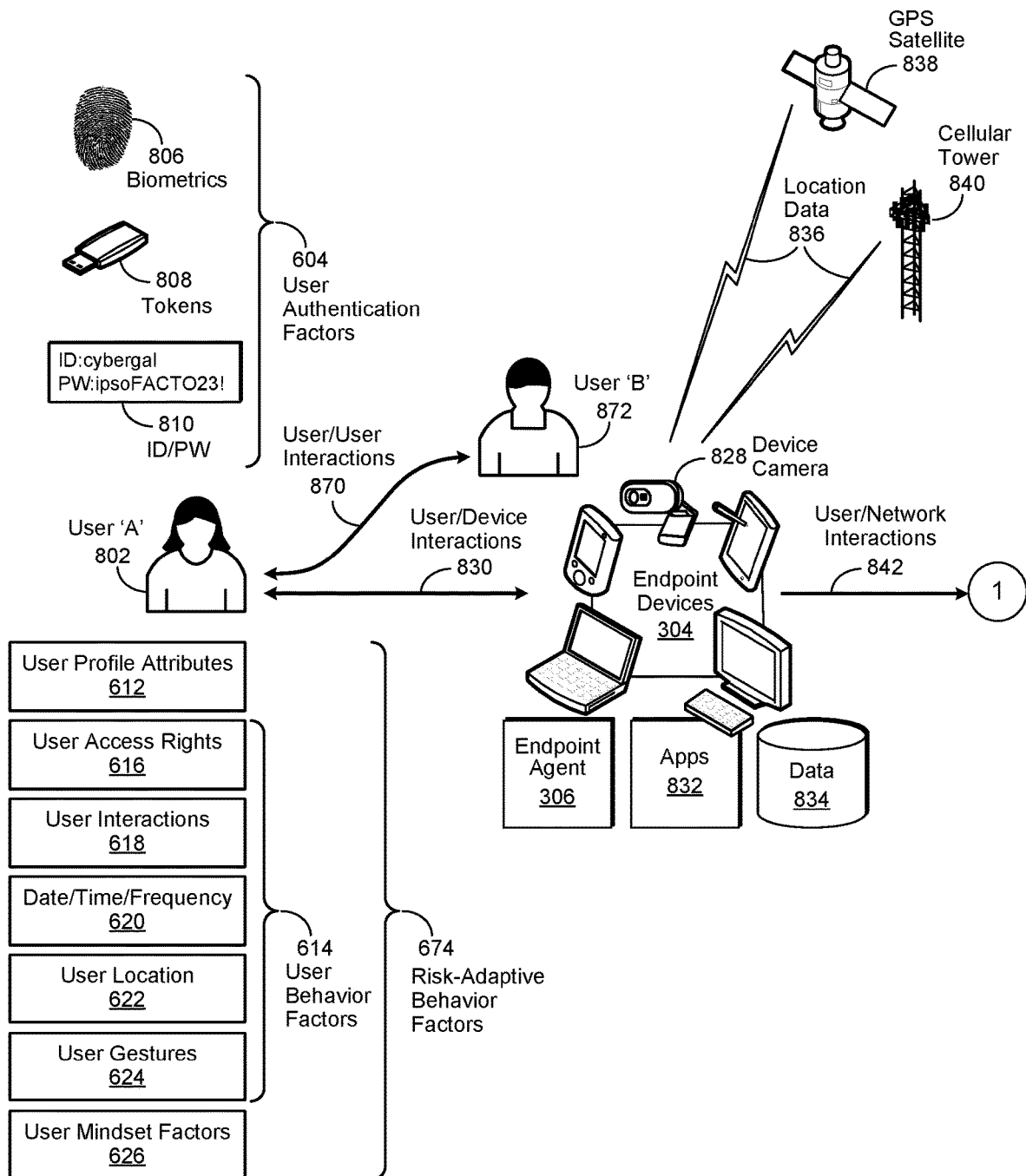
FIGS. 8a and 8b shows a block diagram of a security analytics system environment.
Figure 8B:
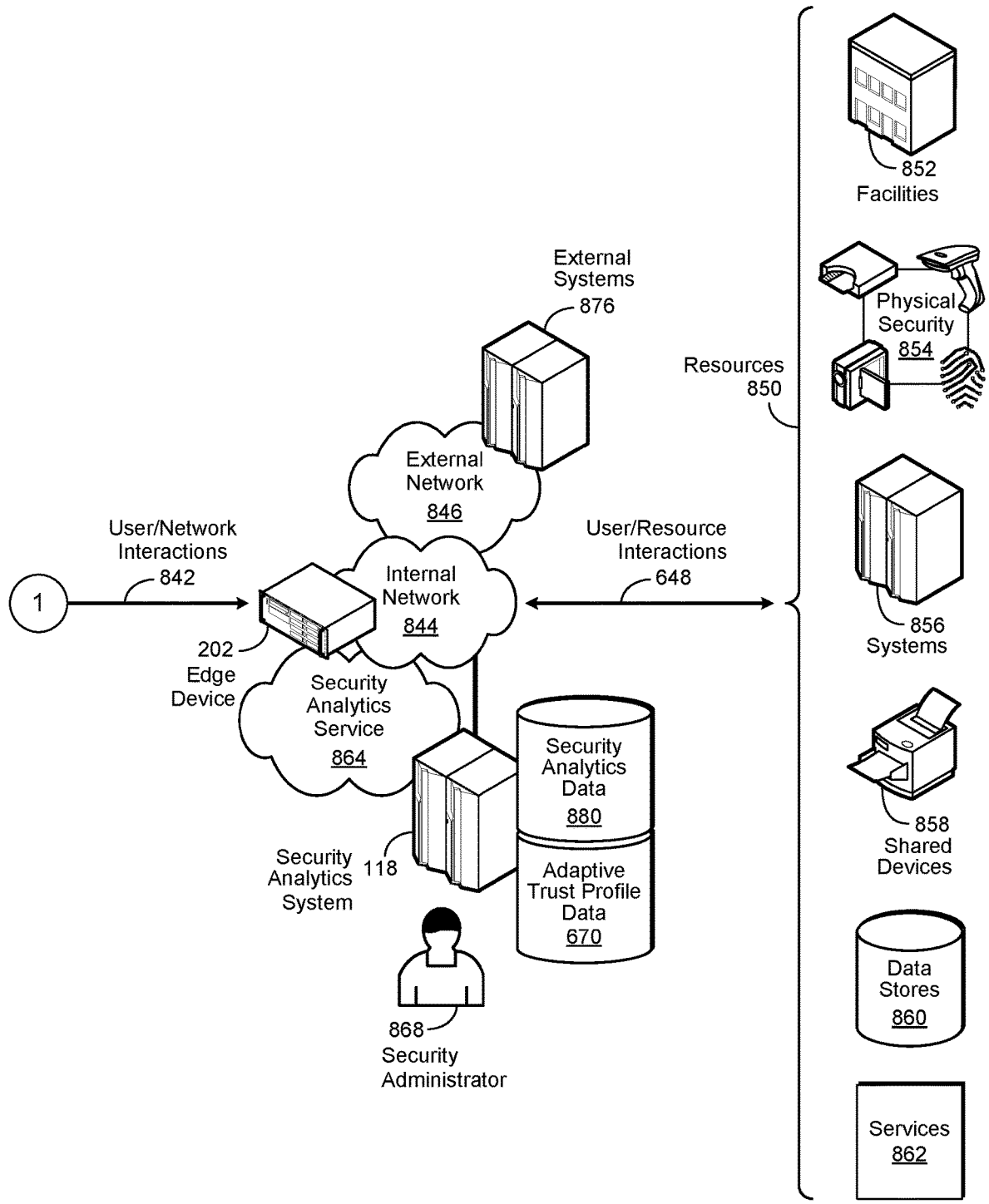

FIGS. 8a and 8b show a block diagram of a security analytics environment implemented in accordance with an embodiment of the invention. In certain embodiments, analyses performed by a security analytics system 118 may be used to identify behavior associated with a particular entity that may be of analytic utility. In certain embodiments, the entity behavior of analytic utility may be identified at a particular point in time, during the occurrence of an event, the enactment of a user or non-user behavior, or a combination thereof.

As used herein, an entity broadly refers to something that exists as itself, whether physically or abstractly. In certain embodiments, an entity may be a user entity, a non-user entity, or a combination thereof. In certain embodiments, a user entity may be an individual user, such as user 'A' 802 or 'B' 872, a group, an organization, or a government. In certain embodiments, a non-user entity may likewise be an item, a device, such as endpoint 304 and edge 202 devices, a network, such as an internal 844 and external 846 networks, a domain, an operation, or a process. In certain embodiments, a non-user entity may be a resource 850, such as a geographical location or formation, a physical facility 852, such as a venue, various physical security devices 854, a system 856, shared devices 858, such as printer, scanner, or copier, a data store 860, or a service 862, such as a service 862 operating in a cloud environment.

As likewise used herein, an event broadly refers to the occurrence of an action performed by an entity. In certain embodiments, the action may be directly associated with a user behavior, described in greater detail herein. As an example, a first user may attach a binary file infected with a virus to an email that is subsequently sent to a second user. In this example, the act of attaching the binary file to the email is directly associated with a user behavior enacted by the first user. In certain embodiments, the action may be indirectly associated with a user behavior. To continue the example, the recipient of the email may open the infected binary file, and as a result, infect their computer with malware. To further continue the example, the act of opening the infected binary file is directly associated with a user behavior enacted by the second user. However, the infection of the email recipient's computer by the infected binary file is indirectly associated with the described user behavior enacted by the second user.

In various embodiments, certain user authentication factors 604 may be used to authenticate the identity of a user entity. In certain embodiments, the user authentication factors 604 may be used to ensure that a particular user, such as user 'A' 802 or 'B' 872, is associated with their corresponding user entity profile, rather than a user entity profile associated with another user. In certain embodiments, the user authentication factors 604 may include a user's biometrics 806 (e.g., a fingerprint or retinal scan), tokens 808 (e.g., a dongle containing cryptographic keys), user identifiers and passwords (ID/PW) 810, and personal identification numbers (PINs).

In certain embodiments, information associated with such user behavior may be stored in a user entity profile, described in greater detail herein. In certain embodiments, the user entity profile may be stored in a repository of adaptive trust profile (ATP) data 670. In certain embodiments, as likewise described in greater detail herein, the user entity profile may include user profile attributes 612, user behavior factors 614, user mindset factors 626, or a combination thereof. As used herein, a user profile attribute 612 broadly refers to data or metadata that can be used, individually or in combination with other user profile attributes 612, user behavior factors 614, or user mindset factors 626, to ascertain the identity of a user entity. In various embodiments, certain user profile attributes 612 may be uniquely associated with a particular user entity.

As likewise used herein, a user behavior factor 614 broadly refers to information associated with a user's behavior, whether the behavior occurs within a physical realm or cyberspace. In certain embodiments, the user behavior factors 614 may include the user's access rights 616, the user's interactions 618, and the date/time/frequency 620 of those interactions 618. In certain embodiments, the user behavior factors 614 may likewise include the user's location 622 when the interactions 618 are enacted, and the user gestures 624 used to enact the interactions 618.

In various embodiments, certain date/time/frequency 620 user behavior factors 614 may be implemented as ontological or societal time, or a combination thereof. As used herein, ontological time broadly refers to how one instant in time relates to another in a chronological sense. As an example, a first user behavior enacted at 12:00 noon on May 17, 2017 may occur prior to a second user behavior enacted at 6:39 PM on May 18, 2018. Skilled practitioners of the art will recognize one value of ontological time is to determine the order in which various user behaviors have been enacted.

As likewise used herein, societal time broadly refers to the correlation of certain user profile attributes 612, user behavior factors 614, user mindset factors 626, or a combination thereof, to one or more instants in time. As an example, user 'A' 802 may access a particular system 856 to download a customer list at 3:47 PM on Nov. 3, 2017. Analysis of their user behavior profile indicates that it is not unusual for user 'A' 802 to download the customer list on a weekly basis. However, examination of their user behavior profile also indicates that user 'A' 802 forwarded the downloaded customer list in an email message to user 'B' 872 at 3:49 PM that same day. Furthermore, there is no record in their user behavior profile that user 'A' 802 has ever communicated with user 'B' 872 in the past. Moreover, it may be determined that user 'B' 872 is employed by a competitor. Accordingly, the correlation of user 'A' 806 downloading the customer list at one point in time, and then forwarding the customer list to user 'B' 872 at a second point in time shortly thereafter, is an example of societal time.

In a variation of the prior example, user 'A' 802 may download the customer list at 3:47 PM on Nov. 3, 2017. However, instead of immediately forwarding the customer list to user 'B' 872, user 'A' 802 leaves for a two week vacation. Upon their return, they forward the previously-downloaded customer list to user 'B' 872 at 9:14 AM on Nov. 20, 2017. From an ontological time perspective, it has been two weeks since user 'A' 802 accessed the system 856 to download the customer list. However, from a societal time perspective, they have still forwarded the customer list to user 'B' 872, despite two weeks having elapsed since the customer list was originally downloaded.

Accordingly, the correlation of user 'A' 802 downloading the customer list at one point in time, and then forwarding the customer list to user 'B' 872 at a much later point in time, is another example of societal time. More particularly, it may be inferred that the intent of user 'A' 802 did not change during the two weeks they were on vacation. Furthermore, user 'A' 802 may have attempted to mask an intended malicious act by letting some period of time elapse between the time they originally downloaded the customer list and when they eventually forwarded it to user 'B' 872. From the foregoing, those of skill in the art will recognize that the use of societal time may be advantageous in determining whether a particular entity behavior is of analytic utility. As used herein, mindset factors 626 broadly refer to information used to infer the mental state of a user at a particular point in time, during the occurrence of an event, an enactment of a user behavior, or combination thereof.

In certain embodiments, the security analytics system 118 may be implemented to process certain entity information associated with providing resolution of the identity of an entity at a particular point in time. In various embodiments, the security analytics system 118 may be implemented to use certain entity identifier information, likewise described in greater detail herein, to ascertain the identity of an associated entity at a particular point in time. In various embodiments, the entity identifier information may include certain temporal information. In certain embodiments, the temporal information may be associated with an event associated with a particular point in time.

In certain embodiments, the security analytics system 118 may be implemented to use information associated with certain user behavior elements to resolve the identity of an entity at a particular point in time. A user behavior element, as used herein, broadly refers to a discrete element of a user entity's behavior during the performance of a particular operation in a physical realm, cyberspace, or a combination thereof. In certain embodiments, such user behavior elements may be associated with a user/device 830, a user/network 842, a user/resource 848, a user/user 860 interaction, or a combination thereof.

As an example, user 'A' 802 may use an endpoint device 304 to browse a particular web page on a news site on an external system 876. In this example, the individual actions performed by user 'A' 802 to access the web page are user behavior elements that constitute a user behavior. As another example, user 'A' 802 may use an endpoint device 304 to download a data file from a particular system 856. In this example, the individual actions performed by user 'A' 802 to download the data file, including the use of one or more user authentication factors 604 for user authentication, are user behavior elements that constitute a user behavior. In certain embodiments, the user/device 830 interactions may include an interaction between a user, such as user 'A' 802 or 'B' 872, and an endpoint device 304.

In certain embodiments, the user/device 830 interaction may include interaction with an endpoint device 304 that is not connected to a network at the time the interaction occurs. As an example, user 'A' 802 or 'B' 872 may interact with an endpoint device 304 that is offline, using applications 832, accessing data 834, or a combination thereof, it may contain. Those user/device 830 interactions, or their result, may be stored on the endpoint device 304 and then be accessed or retrieved at a later time once the endpoint device 304 is connected to the internal 844 or external 846 networks. In certain embodiments, an endpoint agent 306 may be implemented to store the user/device 830 interactions when the user device 304 is offline.

In certain embodiments, an endpoint device 304 may be implemented with a device camera 828. In certain embodiments, the device camera 828 may be integrated into the endpoint device 304. In certain embodiments, the device camera 828 may be implemented as a separate device configured to interoperate with the endpoint device 304. As an example, a webcam familiar to those of skill in the art may be implemented receive and communicate various image and audio signals to an endpoint device 304 via a Universal Serial Bus (USB) interface.

In various embodiments, the device camera 828 may be implemented to provide surveillance information related to certain user/device 830 or user/user 870 interactions. In certain embodiments, the surveillance information may be used by the security analytics system 118 to detect behavior associated with a user entity, such as user 'A' 802 or user 'B' 872 that may be of analytic utility.

In certain embodiments, the endpoint device 304 may be used to communicate data through the use of an internal network 844, an external network 846, or a combination thereof. In certain embodiments, the internal 844 and the external 846 networks may include a public network, such as the Internet, a physical private network, a virtual private network (VPN), or any combination thereof. In certain embodiments, the internal 844 and external 846 networks may likewise include a wireless network, including a personal area network (PAN), based on technologies such as Bluetooth. In various embodiments, the wireless network may include a wireless local area network (WLAN), based on variations of the IEEE 802.11 specification, commonly referred to as WiFi. In certain embodiments, the wireless network may include a wireless wide area network (WWAN) based on an industry standard including various 3G, 4G and 5G technologies.

In certain embodiments, the user/user 870 interactions may include interactions between two or more user entities, such as user 'A' 802 and 'B' 872. In certain embodiments, the user/user interactions 870 may be physical, such as a face-to-face meeting, via a user/device 830 interaction, a user/network 842 interaction, a user/resource 648 interaction, or some combination thereof. In certain embodiments, the user/user 870 interaction may include a face-to-face verbal exchange. In certain embodiments, the user/user 870 interaction may include a written exchange, such as text written on a sheet of paper. In certain embodiments, the user/user 870 interaction may include a face-to-face exchange of gestures, such as a sign language exchange.

In certain embodiments, temporal event information associated with various user/device 830, user/network 842, user/resource 848, or user/user 870 interactions may be collected and used to provide real-time resolution of the identity of an entity at a particular point in time. Those of skill in the art will recognize that many such examples of user/device 830, user/network 842, user/resource 848, and user/user 870 interactions are possible. Accordingly, the foregoing is not intended to limit the spirit, scope or intent of the invention.

In various embodiments, the security analytics system 118 may be implemented to process certain contextual information in the performance of certain security analytic operations. As used herein, contextual information broadly refers to any information, directly or indirectly, individually or in combination, related to a particular entity behavior. In certain embodiments, entity behavior may include a user entity's physical behavior, cyber behavior, or a combination thereof. As likewise used herein, a user entity's physical behavior broadly refers to any user behavior occurring within a physical realm, such as speaking, gesturing, facial patterns or expressions, walking, and so forth. More particularly, such physical behavior may include any action enacted by an entity user that can be objectively observed, or indirectly inferred, within a physical realm. In certain embodiments, the objective observation, or indirect inference, of the physical behavior may be performed electronically.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable user behavior broadly refers to any behavior exhibited or enacted by a user entity that can be observed through the use of an electronic device (e.g., an electronic sensor), a computing device or system (e.g., an endpoint 304 or edge 202 device, a physical security device 854, a system 856, a shared device 858, etc.), computer instructions (e.g., a software application), or a combination thereof.

Cyber behavior, as used herein, broadly refers to any behavior occurring in cyberspace, whether enacted by an individual user, a group of users, or a system acting at the behest of an individual user, a group of users, or other entity. More particularly, cyber behavior may include physical, social, or mental actions that can be objectively observed, or indirectly inferred, within cyberspace. As an example, a user may use an endpoint device 304 to access and browse a particular website on the Internet. In this example, the individual actions performed by the user to access and browse the website constitute a cyber behavior. As another example, a user may use an endpoint device 304 to download a data file from a particular system 856 at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, which makes them electronically-observable.

In certain embodiments, the contextual information may include location data 836. In certain embodiments, the endpoint device 304 may be configured to receive such location data 836, which is used as a data source for determining the user's location 622. In certain embodiments, the location data 836 may include Global Positioning System (GPS) data provided by a GPS satellite 838. In certain embodiments, the location data 836 may include location data 836 provided by a wireless network, such as from a cellular network tower 840. In certain embodiments (not shown), the location data 836 may include various Internet Protocol (IP) or other network address information assigned to the endpoint 304 or edge 202 device. In certain embodiments (also not shown), the location data 836 may include recognizable structures or physical addresses within a digital image or video recording.

In certain embodiments, the endpoint devices 304 may include an input device (not shown), such as a keypad, magnetic card reader, token interface, biometric sensor, and so forth. In certain embodiments, such endpoint devices 304 may be directly, or indirectly, connected to a particular facility 852, physical security device 854, system 856, or shared device 858. As an example, the endpoint device 304 may be directly connected to an ingress/egress system, such as an electronic lock on a door or an access gate of a parking garage. As another example, the endpoint device 304 may be indirectly connected to a physical security device 854 through a dedicated security network.

In certain embodiments, the security analytics system 118 may be implemented to perform various risk-adaptive protection operations. Risk-adaptive, as used herein, broadly refers to adaptively responding to risks associated with an electronically-observable entity behavior. In various embodiments, the security analytics system 118 may be implemented to perform certain risk-adaptive protection operations by monitoring certain entity behaviors, assess the corresponding risk they may represent, individually or in combination, and respond with an associated response. In certain embodiments, such responses may be based upon contextual information, described in greater detail herein, associated with a given entity behavior.

Figure 9:
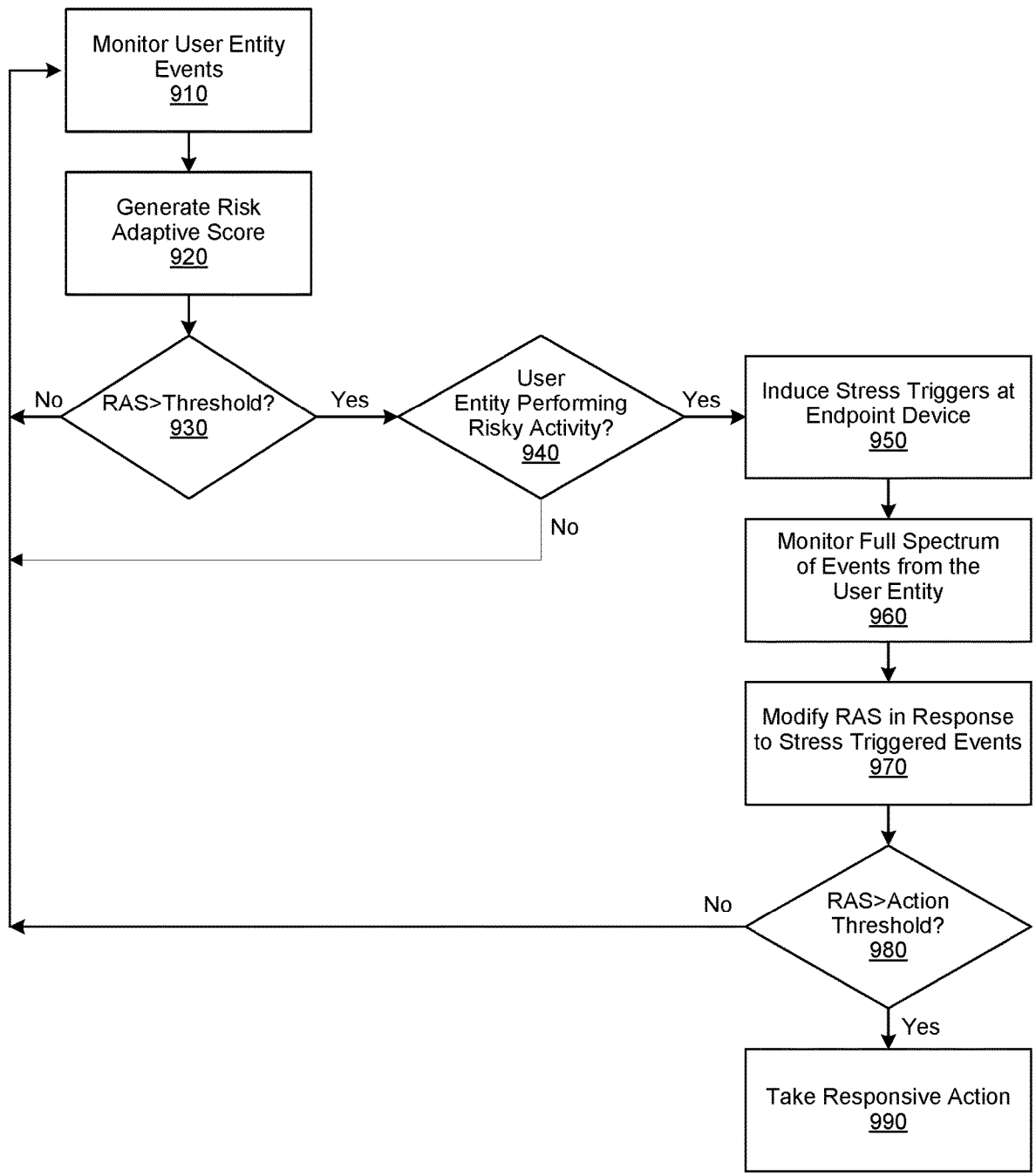
FIG. 9 is a simplified flow diagram illustrating an example embodiment of a contextualization process to enhance the ability of a security analytics system to determine the context of risk associated with behavior of a user entity.

FIG. 9 is a simplified flow diagram illustrating an example embodiment of a process executed by contextualization 716 module to enhance the ability of adaptive trust profile system 120 to determine the context of risk associated with behavior of a user entity. Embodiments leverage a knowledge of user entity behavior traits tracked in adaptive trust profile 640 along with an ability to trigger stress stimuli and monitoring for specific responses through an endpoint agent 306 on an endpoint device 304 accessed by the user entity.

In general, people respond with specific traits and reactions when involved with malicious activities that they are attempting to hide. They are instinctively more aware of their environment when in a potentially vulnerable situation, such as carrying out illegal or undesirable behavior, where there is a possibility of being caught. This results in changes of behavior and biometrics, such as quickened pulse, rapid eye movement, surreptitious actions (e.g., hiding what they are doing), and the like. Embodiments take advantage of this enhanced environmental awareness to trigger events to gain additional context of the behavior of a user entity, where previous events raise to a threshold level of risk.

In FIG. 9, security analytics system 118 monitors events (e.g., event i 706, event i+1 708, event i+n 710) generated by a user entity (910). As discussed above, information associated with an event i 706 can include user profile attributes, user behavior factors, user mindset factors, entity state information, contextual information, and the like. In addition, historical ATP data 670 can be retrieved and associated with the event data to determine whether the event(s) are associated with potentially anomalous events by anomaly detection 714 operations. If so, then the event can pass to contextualization 716 operations.

As part of contextualization 716 operations, or alternatively anomaly detection 714 operations, the security analytics system can generate a risk adaptive score (RAS) associated with the event(s) (920). The risk adaptive score can be a weighted blend of the various risk-adaptive behavior factors 674 associated with the user entity and the event(s) that led to the detection of anomalous behavior. The security analytics system can compare the risk adaptive score with a predetermined risk acceptance threshold (930). The predetermined risk acceptance threshold can be a general risk acceptance threshold for the system, or can be a specific risk acceptance threshold associated with an event type (e.g., differing risk acceptance thresholds can be associated with differing types of behavior). If the risk adaptive score is lower than the risk acceptance threshold, then the system can resume monitoring user entity events (910). If the risk adaptive score is greater than the risk acceptance threshold, then the security analytics system can determine whether the user entity is performing risky activity (940). Such a determination can be made by analyzing characteristics of the event as well as the ATP associated with the user entity. Certain events that may be risky for certain user entities may not be risky for other user entities having a higher security clearance, specific administrator attributes associated with their account, and the like. Examples of risky activity can include accessing company critical data, customer data, or personnel files, and the like. If the determination is that the user entity is not performing a risky activity for that user, then the security analytics system can resume monitoring user entity events (910).

Should the system determine that the user entity is performing a risky activity for that user, then the security analytics system can proceed to develop additional context associated with that user entity and the current behavior. One embodiment illustrated in FIG. 9 induces stress triggers at the endpoint device 304 at which the user entity is accessing the network and generating the events. Stress triggers are designed to cause a reaction on the part of the user entity and thereby generate additional events i+n 710 that the security analytics system 118 can analyze to determine additional context behind the user entity's current access.

As an example, an employee may be accessing social media in an organization that social media access during work hours is frowned upon, but not outright blocked. At the time they are accessing social media, the employee may be more aware of people passing by their desk. If a colleague was to walk past their desk, an instinctive speed response may be to minimize the browser window faster than they typically minimize a browser window. In order to simulate such a scenario, the system could momentarily change screen brightness, or an erratic movement of the mouse could cause a subconscious indication that there is something out of the ordinary, and react in the same way as if the colleague were walking past.

Embodiments are configured on the premise that a user intent on carrying out malicious, or otherwise risky, activity will be more aware of any environmental changes and more likely to react, however subtly, in an atypical manner. Endpoint agent 306 in the endpoint device 304 accessed by the user entity is configured to control various functions of the endpoint device to induce a variety of stress triggers to cause such reactions. Examples of such stress triggers include varying screen brightness for brief periods, adjusting gesture input device (e.g., mouse, trackball, trackpad, and touch sensitive screen) speed and responsiveness for brief periods, modifying scroll wheel responsiveness and speed, swapping keyboard key associations, playing a tone or other sounds on the speaker, displaying pop up windows, providing random emails with suggestive subject headings, other types of notifications, and the like. In response to the determination that the particular user entity is engaged in risky activity (940), such stress triggers can be induced at the endpoint device by security analytics system 118 (950).

Subsequent to the inducing of the stress triggers, the security analytics system monitors the response events from the user entity (960). The system can monitor for specific stress-related responses associated with the particular risky behavior, or can monitor a full-spectrum of events from the user entity. User reactions can include, for example, random motion of a gesture input device (e.g., mouse), closing applications abruptly, closing a lid of a laptop-type computer, changing pressure of keystrokes, faster typing, changes in facial expressions, rapid eye movement, ceasing file transfers, and the like.

In response to the user entity events received in response to the stress trigger, the security analytics system modifies the risk adaptive score (970). Such modification can increase or decrease the RAS through a risk multiplier associated with the nature of the activity and the nature of the response. As the stress triggered events are processed, the system can determine whether the modified RAS exceeds a risk action threshold (980). The predetermined risk action threshold can be associated with the nature of the risky activity, and in the event the threshold is exceeded, the system can then take responsive action (990). If the risk action threshold is not exceeded, the system can return to monitoring events (910). Alternatively, the system can induce additional stress triggers to more fully contextualize the nature of the risk-associated events (e.g., step 950).

As discussed above, security analytics system 118 can be configured to respond automatically to risky behavior, by, for example, logging a user entity off the system, stopping file transfers, breaking or throttling network connections, and the like. Alternatively, the system can inform a security administrator 868 of the details of the risky behavior and the security administrator can insert their judgment into how to respond to the behavior.

It should therefore be appreciated that incorporating embodiments of the stress stimuli trigger process illustrated in FIG. 9 in the security analytics system 118 allows for development of enhanced contextual information regarding events generated by a user entity. The system following up on generated events in this manner establishes a type of two-way communication between the security analytics system and the user entity to more fully establish the intent of the user entity prior to taking steps to stop the behavior.

In certain embodiments, various risk-adaptive behavior factors 674, likewise described in greater detail herein, may be used to perform the risk-adaptive protection operations. In certain embodiments, the risk-adaptive behavior factors 674 may include user profile attributes 612, user behavior factors 614, user mindset factors 626, or a combination thereof. In these embodiments, the risk-adaptive behavior factors 674 used to perform the risk-adaptive protection operations is a matter of design choice.

In certain embodiments, the security analytics system 118 may be implemented as a stand-alone system. In certain embodiments, the security analytics system 118 may be implemented as a distributed system. In certain embodiment, the security analytics system 118 may be implemented as a virtual system, such as an instantiation of one or more virtual machines (VMs). In certain embodiments, the security analytics system 118 may be implemented as a security analytics service 864. In certain embodiments, the security analytics service 864 may be implemented in a cloud environment familiar to those of skill in the art. In various embodiments, the security analytics system 118 may use data stored in a repository of security analytics data 880 in the performance of certain security analytics operations, described in greater detail herein. Those of skill in the art will recognize that many such embodiments are possible. Accordingly, the foregoing is not intended to limit the spirit, scope or intent of the invention.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implemented method for developing context of risk-associated behavior in a security analytics environment, the method comprising:

monitoring a first plurality of electronically-observable actions of a user entity operating within the security analytics environment, wherein the first plurality of electronically-observable actions of the user entity correspond to a respective plurality of events enacted by the user entity;

converting the first plurality of electronically-observable actions of the user entity to electronic information representing the plurality of events enacted by the user entity;

generating a risk adaptive score based on the electronic information representing the plurality of events enacted by the user entity;

generating one or more stress triggers at an endpoint device in the security analytics environment accessed by the user entity if the risk adaptive score exceeds a predetermined threshold in order to develop a context of the first plurality of electronically-observable actions of the user entity, the one or more stress triggers being designed to cause a reaction from the user entity, the reaction from the user entity generating an additional action of the user entity, the additional action of the user entity being analyzed by the security analytics environment to develop additional context of the first plurality of electronically-observable actions of the user entity;

monitoring a second plurality of electronically-observable actions of the user entity, wherein the second plurality of electronically-observable actions of the user entity correspond to a respective second plurality of events enacted by the user entity and the second plurality of events are in response to one or more of the stress triggers;

converting the second plurality of electronically-observable actions of the user entity to second electronic information representing the second plurality of actions by the user entity;

modifying the risk adaptive score in response to the second plurality of electronically observable actions; and responding to the first and second plurality of electronically-observable actions of the user entity if the modified risk adaptive score exceeds a second predetermined threshold;

and wherein said responding to the first and second plurality of electronically-observable actions comprises one or more of logging the user entity off the endpoint device, shutting down the endpoint device, cancelling a process executed by the user entity, signaling a security administrator, and signaling the user entity.

2. The method of claim 1 wherein said responding to the first and second plurality of electronically-observable actions comprises reducing a risk presented by the first plurality of electronically-observable actions of the user entity to a system encompassed within the security analytics environment.

3. The method of claim 1 wherein the second plurality of electronically-observable actions of the user entity comprise physical behavior interactions with the endpoint device comprising one or more of key stroke impact, key stroke speed, misspelling words, facial expressions, and movement of a gesture input device.

4. The method of claim 1 wherein the second plurality of electronically-observable actions of the user entity comprise cyber behavior interactions with the endpoint device comprising one or more of discontinuing file access, disconnecting a storage device from the endpoint device, closing a display window on a display coupled to the endpoint device, changing an operational state of the endpoint device, and closing a lid of the endpoint device.

5. The method of claim 1 wherein the one or more stress triggers comprise one or more of:
modifying brightness of a screen coupled to the endpoint device;
modifying display speed of a gesture input device coupled to the endpoint device;
modifying responsiveness of a gesture input device coupled to the endpoint device;
temporarily swapping one or more key associations of a keyboard coupled to the endpoint device;
generating a sound on a speaker coupled to the endpoint device;
displaying a popup window on the screen coupled to the endpoint device; and
sending an electronic mail message to the user entity.

6. The method of claim 1 further comprising performing said generating the one or more stress triggers if the first plurality of electronically-observable actions are identified as risk-associated behavior.

7. The method of claim 6 wherein a risk-associated behavior comprises one or more of accessing data labeled as critical, accessing customer data, copying significant quantities of data to a removable memory device, copying significant quantities of data across a network external to the security analytics environment.

8. A security analytics system comprising:
a processor;
a network interface, coupled to the processor and communicatively coupled to a remote network node via a network, and configured to receive electronic information representing a first plurality of events enacted by a user entity accessing the remote network node; and
a nontransitory, computer-readable storage medium, coupled to the processor, and storing instructions executable by the processor and configured to
generate a risk adaptive score based on the electronic information representing the first plurality of events enacted by the user entity,
generating one or more stress triggers at an endpoint device in the security analytics environment accessed by the user entity if the risk adaptive score exceeds a predetermined threshold in order to develop a context of the first plurality of electronically-observable actions of the user entity, the one or more stress triggers being designed to cause a reaction from the user entity, the reaction from the user entity generating an additional action of the user entity, the additional action of the user entity being analyzed by the security analytics environment to develop additional context of the first plurality of electronically-observable actions of the user entity;
monitoring a second plurality of electronically-observable actions of the user entity, wherein the second plurality of electronically-observable actions of the user entity correspond to a respective second plurality of events enacted by the user entity and the second plurality of events are in response to one or more of the stress triggers;
converting the second plurality of electronically-observable actions of the user entity to second electronic information representing the second plurality of actions by the user entity;
modifying the risk adaptive score in response to the second plurality of electronically-observable actions; and
responding to the first and second plurality of electronically-observable actions of the user entity if the modified risk adaptive score exceeds a second predetermined threshold; and wherein
said responding to the first and second plurality of events comprises one or more of
transmitting a signal to the remote network node to log the user entity off the remote network node;
transmitting a signal to the remote network node to shut down the remote network node;
transmitting a signal to the remote network node to cancel a process executed by the user entity;
transmitting a signal to a security administrator of the security analytics system; and
transmitting a signal to the user entity.

9. The system of claim 8 wherein responding to the first and second plurality of events comprises reducing a risk presented by the first plurality of events to an environment secured by the security analytics system.

10. The system of claim 8 wherein the second plurality of events comprises physical behavior interactions with the remote network device comprising one or more of key stroke impact, key stroke speed, misspelling words, facial expressions, and movement of a gesture input device.

11. The system of claim 8 wherein the second plurality of events comprises cyber behavior interactions with the remote network device comprising one or more of discontinuing file access, disconnecting a storage device from the remote network node, closing a display window on a display coupled to the remote network node, changing an operational state of the remote network node, and closing a lid of the remote network node.

12. The system of claim 8 wherein the one or more stress triggers comprise one or more of:
  modifying display speed of a gesture input device coupled to the endpoint device;
  modifying responsiveness of a gesture input device coupled to the endpoint device;
  temporarily swapping one or more key associations of a keyboard coupled to the endpoint device;
  generating a sound on a speaker coupled to the endpoint device;
  displaying a popup window on the screen coupled to the endpoint device; and
  sending an electronic mail message to the user entity.

13. The system of claim 8 wherein the non-transitory, computer-readable storage medium stores further instructions executable by the processor configured to transmit the signal to the remote network node to generate the one or more stress triggers if the first plurality of electronically-observable actions are identified as risk-associated behavior.

14. The system of claim 13 wherein a risk-associated behavior comprises one or more of accessing data labeled as critical, accessing customer data, copying significant quantities of data to a removable memory device, copying significant quantities of data across a network external to the security analytics environment.

15. A non-transitory, computer-readable storage medium storing computer program code, the computer program code comprising computer executable instructions configured for:
  monitoring a first plurality of electronically-observable actions of a user entity operating within a security analytics environment, wherein the plurality of electronically observable actions of the user entity correspond to a respective plurality of events enacted by the user entity;
  converting the plurality of electronically-observable actions of the user entity to electronic information representing the plurality of actions by the user entity;
  generating a risk adaptive score based on the electronic information representing the plurality of actions by the user entity;
  generating one or more stress triggers at an endpoint device in the security analytics environment accessed by the user entity if the risk adaptive score exceeds a predetermined threshold in order to develop a context of the first plurality of electronically-observable actions of the user entity, the one or more stress triggers being designed to cause a reaction from the user entity, the reaction from the user entity generating an additional action of the user entity, the additional action of the user entity being analyzed by the security analytics environment to develop additional context of the first plurality of electronically-observable actions of the user entity;
  monitoring a second plurality of electronically-observable actions of the user entity, wherein the second plurality of electronically-observable actions of the user entity correspond to a respective second plurality of events enacted by the user entity and the second plurality of events are in response to one or more of the stress triggers;
  converting the second plurality of electronically-observable actions of the user entity to second electronic information representing the second plurality of actions by the user entity;
  modifying the risk adaptive score in response to the second plurality of electronically observable actions; and
  responding to the first and second plurality of electronically-observable actions of the user entity if the modified risk adaptive score exceeds a second predetermined threshold; and
  wherein said responding to the first and second plurality of electronically-observable actions comprises one or more of
  logging the user entity off the endpoint device,
  shutting down the endpoint device,
  cancelling a process executed by the user entity,
  signaling a security administrator, and s
  signaling the user entity.

* * * * *